(12) United States Patent
Yamamura et al.

(10) Patent No.: US 9,171,312 B2
(45) Date of Patent: Oct. 27, 2015

(54) CONTEXT INFORMATION COLLECTION MANAGEMENT SYSTEM

(75) Inventors: Shinya Yamamura, Fukuoka (JP); Jun Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1005 days.

(21) Appl. No.: 12/923,654

(22) Filed: Sep. 30, 2010

(65) Prior Publication Data

US 2011/0082891 A1 Apr. 7, 2011

Related U.S. Application Data

(63) Continuation of application No. PCT/JP2008/056396, filed on Mar. 31, 2008.

(51) Int. Cl.
*G06F 17/30* (2006.01)
*G06Q 30/02* (2012.01)

(52) U.S. Cl.
CPC .......... *G06Q 30/02* (2013.01); *G06F 17/30011* (2013.01)

(58) Field of Classification Search
None
See application file for complete search history.

(56) References Cited

U.S. PATENT DOCUMENTS

| | | | |
|---|---|---|---|
| 8,113,418 B2 * | 2/2012 | Howarth et al. | 235/375 |
| 2007/0038438 A1 * | 2/2007 | Cho et al. | 704/9 |
| 2007/0090951 A1 * | 4/2007 | Chan et al. | 340/572.1 |
| 2007/0208711 A1 * | 9/2007 | Rhoads et al. | 707/3 |

FOREIGN PATENT DOCUMENTS

| | | |
|---|---|---|
| JP | 2006-107185 | 4/2006 |
| JP | 2006-163561 | 6/2006 |
| JP | 2007-511147 | 4/2007 |
| JP | 2007-122688 | 5/2007 |
| JP | 2007-287040 | 11/2007 |
| WO | 2006/102988 | 10/2006 |

OTHER PUBLICATIONS

Japanese Office Action issued Oct. 9, 2012 in corresponding Japanese Patent Application No. 2010-505183.
"WebOTX RFID Manager Introduction", NEC Corporation, Feb. 2008, pp. 1-25.
"Survey Report on Study Matters in Introduction of EPC RFID System", The Distribution Systems Research Institute, Mar. 2006, pp. 1-47.

(Continued)

*Primary Examiner* — Rehana Perveen
*Assistant Examiner* — Hung Havan
(74) *Attorney, Agent, or Firm* — Staas & Halsey LLP

(57) ABSTRACT

A context information collection and distribution system registers read identification information in a computer device that manages and controls an RFID tag reading device and is located in a lowest hierarchy in wide area network topology. The computer device located in the lowest hierarchy in the wide area network topology notifies a computer device located in a higher management domain hierarchy that the computer device located in the lowest hierarchy manages read identification information of a target. Further, the computer device located in the management domain hierarchy notifies a computer device located in much higher ID system hierarchy that the computer device located in the hierarchy just under the management domain hierarchy manages the read identification information of the target.

11 Claims, 21 Drawing Sheets

(56) References Cited

OTHER PUBLICATIONS

"Toreesabiritii To Anshin, Anzen (Traceability with Security and Safety)", Material Flow, Ryuken Col., vol. 47, No. 7, Jul. 2006, pp. 34-41.
Japanese Office Action mailed May 8, 2012 issued in related Japanese Patent Application No. 2010-505183.
Satoshi Ozaki, "Extendable Product Traceability System from Small Start", Toshiba Review, vol. 60, No. 8, Aug. 2005, pp. 27-31.
Tatsuo Matsuura, "Understand technologies through illustrations", Nikkei Systems, vol. 177, Jan. 2008, pp. 98-103.
"Latest standard of EPCglobal standardizing Inter-business data exchange", RFID, No. 1, Dec. 2005, pp. 155-175.
Yusuke Doi et al., "An ID Resolution Scheme to Enable $10^{10}$ Order Item-level Traceability System", Information Processing Society of Japan, Vo. 49, No. 3, Mar. 2008, pp. 1265-1274.
Keita Sunaga, "First Issue: What is RDSC Framework for Logistics", EPCglobal Network experienced by RDSC Framework, Jul. 14, 2006, http://www.atmarkit.co.jp/frfid/rensai/rdsc/rdsc01/rdsc02.html.
"RDSC Framework for Logistics Install Guide", Jul. 5, 2006, Toppan Forms Co., Ltd., http://www.rdsc.jp/middleware/pubdl_exec.aspx.
International Search Report for PCT/JP2008/056396, mailed May 1, 2008.

\* cited by examiner

EVENT BUFFER

ALE-ID CACHE

ALE SPECIFICATION TABLE

XX_YYYY IDENTIFY ID SYSTEM BY FIRST SEVERAL CHARACTERS
001YYYY IDENTIFY ID SYSTEM BY FIRST SEVERAL BITS

CONTEXT INFORMATION COLLECTION MANAGEMENT SYSTEM

CROSS-REFERENCE TO RELATED APPLICATION

This application is a continuation of International Application No. PCT/JP2008/056396, filed on Mar. 31, 2008, the entire contents of which are incorporated herein by reference.

FIELD

The embodiment discussed herein is directed to a context information collection management system, a target identification information detection and collection management device, a domain management device, a semantic information system management device, a route management device, and a context information collection management method for collecting context information according to identification information to uniquely identify a target that is a context information collection target in a context information collection network.

BACKGROUND

Conventionally, a context-aware service which provides target identification information (hereinafter referred to as identification information) to a thing or a person (hereinafter referred to as a target) freely moving in a wide area, detects the identification information on a network, and uses information around the target as context information is known. In the context-aware service, it is a problem how efficiently the context-aware service identifies a detection position of the target on a network in a large scale network infrastructure (hereinafter referred to as a context distribution mechanism) and collects the context information of the target.

To solve the problem, for example, there is a conventional technique as described below. A context collection device and a management server that manages a detection device that detects identification information are worked together through the identification information of the target, and a list of the identification information of the target is notified to the context collection device. The context collection device selects and extracts context information from the list notified from the management server. Therefore the context collection device need not process a large amount of context information from an irrelevant management server, so that the context collection device can quickly provide the context information.

Patent Document 1: Japanese Laid-open Patent Publication No. 2007-287040

However, in the above conventional technique, there is a problem as described below. When using only one context information collection device, which collects tens of thousands to hundreds of millions of identification information items, it is impossible to realize speedy processing even if a high-performance computer device specialized for context information collection processing is used. Hence, distribution of the load of the context information collection device is required.

However, in many cases, the identification information is identification information which is given to a product by a standard-setting organization such as EPC Global used for SCM (Supply Chain Management). Such identification information is temporarily referred at various locations, so that a distribution method such as DNS (Domain Name Service) which is hierarchized and in which load is geographically distributed is effective. The primary objective of the identification information is to manage the product efficiently, and hence the identification information system includes hierarchical semantic information.

Since the identification information is different from network device identification information such as an IP address and an FQDN (Fully Qualified Domain Name), the identification information has no relation to geographic information and network topology.

Therefore, when associating the identification information with the network device identification information to manage them, all network devices to which load is distributed need to have a correspondence relationship between all the identification information items that can be detected on the network and all the network device identification information items of the network devices that refer to the identification information items.

In this case, not only the amount of information of the correspondence relationship is huge, but also the correspondence relationship between all the identification information items and all the network devices needs to be managed synchronously, so that there is a problem that the load of each network device is huge.

Further, since the context information may be referred by a plurality of referrers, some identification information items are associated with identification information of a plurality of network devices located at different positions. Thus there is a problem that paths cannot be aggregated on the network.

To solve the problems as described above and achieve an object, in an aspect of a context information collection management system, a target identification information detection and collection management device, a domain management device, a semantic information system management device, a route management device, and a context information collection management method, a context information collection system is constituted by a global hierarchy in which information including identification information is sorted by referring to a semantic information section of the identification information and a domain hierarchy that is a local hierarchy in which information including identification information is sorted by referring to uniqueness of the identification information in order to detect the identification information from a network, wherein the identification information to identify a person or a thing is constituted by the semantic information section to identify a management domain and a type, and a unique serial number.

In the domain hierarchy, the referrer of the identification information and corresponding context information can obtain the context information including the identification information on the basis of any unique identification information that is registered regardless of the type of the identification information. On the other hand, when referring to information including the identification information over the domain boundary, the context information including the identification information is transmitted to a sorting device of the domain hierarchy which requests a sorting device of the global hierarchy to refer to the information over the domain boundary.

SUMMARY

According to an aspect of an embodiment of the invention, a context information collection management system for collecting and managing target identification information to uniquely identify a target that is used to collect and manage context information and context information corresponding to the target identification information in a context information collection and distribution network, includes a target identification information detection and collection management unit that detects the target identification information represented by a format having unique topology to be identified in each of a plurality of ID systems and collecting and managing the target identification information along with context information corresponding to the target identification information in the context information collection and distribution network; a domain management unit that performs domain management of the target identification information collected by the target identification information detection and collection management unit and the context information corresponding to the target identification information on the basis of uniqueness of the target identification information; a semantic information system management unit that manages the target identification information managed by the domain management unit, for each semantic information system based on semantic information of the target identification information; and a route management unit that integrally manages the target identification information managed by the semantic information system management unit, for each semantic information system.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

A preferred embodiment of the present invention will be explained with reference to accompanying drawings. The context information collection device disclosed in an example of the embodiment below is a context information collection and distribution system (for example, corresponding to a context information collection management system or a context information collection management device) in which a computer device is distributed to each node in wide area network topology hierarchized in a tree structure and the load of context information collection processing is distributed to each computer device.

The context information collection and distribution system, in which each computer device performs the context information collection processing in cooperation with each other via a network, distributes the collected context information among the computer devices. Therefore, the context information collection and distribution system is realized on the context information collection and distribution network.

Figure 1:
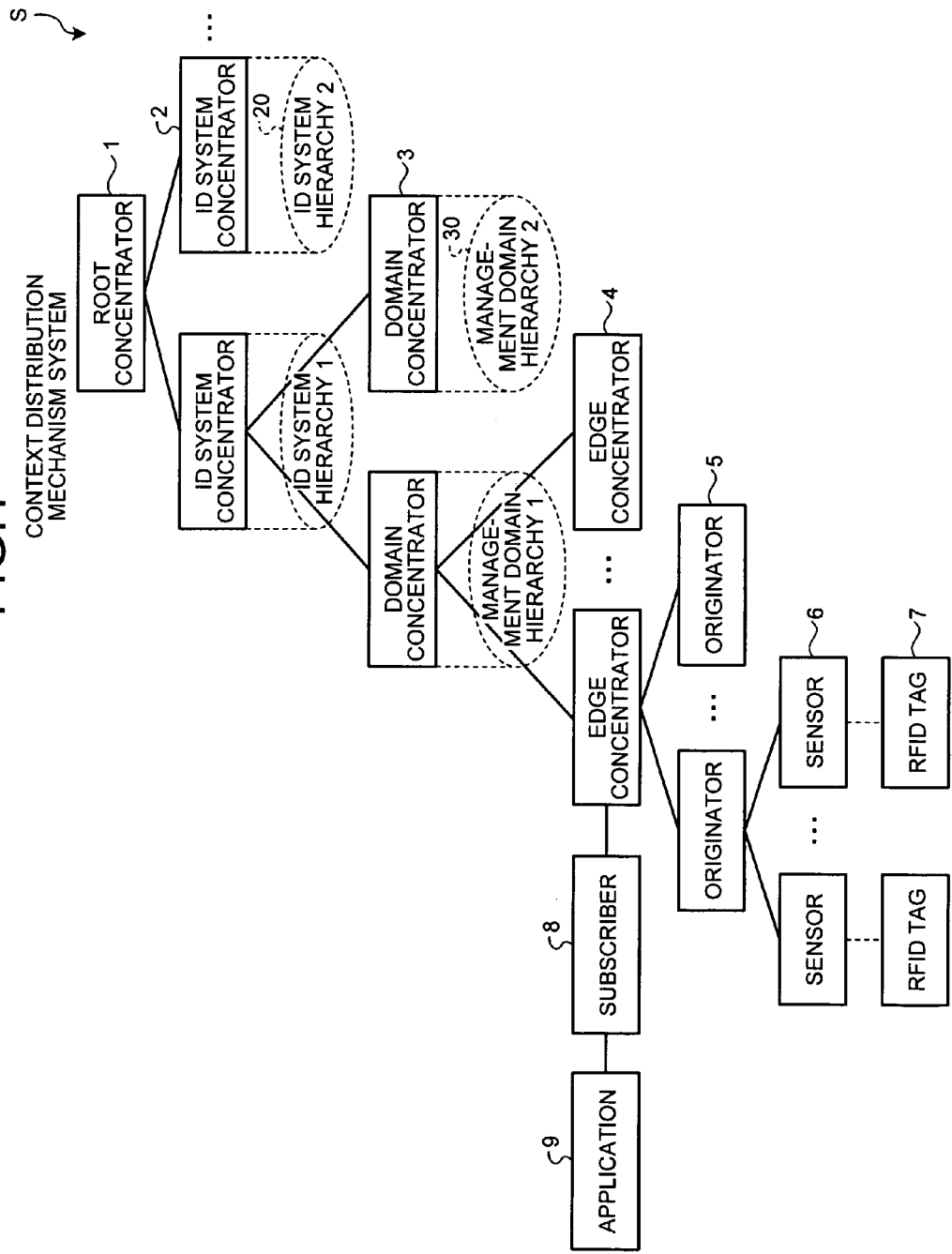
FIG. 1 is a diagram illustrating a configuration of a context information collection and distribution system according to an example of an embodiment.

First, a configuration of the context information collection and distribution system according to an example of the embodiment will be described. FIG. 1 is a diagram illustrating the configuration of the context information collection and distribution system according to the example of the embodiment. As illustrated in FIG. 1, in a context information collection and distribution system S according to the example of the embodiment, one Root Concentrator 1 (for example, corresponding to a route management unit or a route management device) is disposed in the highest hierarchy of a tree structure network. In the hierarchy just under the highest hierarchy, a plurality of ID System Concentrators 2 are disposed.

The Root Concentrator 1 is a device that ties a part illustrating the type of an ID system of an ID to network identification information of the corresponding ID System Concentrator 2 and sorts the information. Here, the ID and the ID system are described as follows.

In the context information collection and distribution system S, a unique identification information of a target such as a person, an animal, or a thing to which an RFID (Radio Frequency ID) tag with the unique identification information written on it is attached is read by RFID tag reading devices widely distributed and installed, and the position of the target can be checked. The ID is the identification information.

The ID system is a combined character string of "ID system identification information+management domain identification information+object identification information+serial number". An example of the "ID system" is illustrated, for example, in the table below.

TABLE 1

| ID system identification information | ER |
|---|---|
| Management domain identification information | 5 characters (ASCII) Default "D0001" |
| Object identification information | 10 characters (ASCII) Default "TESTOBJECT" |
| Serial number | 5 characters (ASCII) 00000 to 99999 |

The Root Concentrator 1 and the ID System Concentrator 2 (for example, corresponding to a semantic information system management unit or a semantic information system management device) constitute the context information collection and distribution system S of the ID. The context information collection and distribution system S is assumed to be established by a standards body of the ID, a service provider that runs its business by providing an ID distribution infrastructure, a communications carrier, or a joint venture of a plurality of companies aiming to share and distribute information.

The Root Concentrator 1 is a device in the highest hierarchy of the hierarchical structure of the context information collection and distribution system S, and manages information of all the ID systems distributed in the context distribution mechanism.

In the hierarchy just under the ID System Concentrator 2, a plurality of Domain Concentrators 3 (for example, corresponding to domain management units or domain management devices) are disposed. The hierarchy just under the ID System Concentrator 2 is referred to as an ID system hierarchy. Thus, the Domain Concentrator 3 belongs to the ID system hierarchy of the ID System Concentrator 2.

Further, in the hierarchies just under each Domain Concentrator 3, a plurality of Edge Concentrators 4 (for example, corresponding to target identification information detection and collection management units or target identification information detection and collection management devices) are disposed. The ID System Concentrator 2 is a device that ties each part constituting the ID in accordance with the structure of the ID system (for example, target identification information represented by a format having unique topology to identify a target in a plurality of ID systems) to the network identification information of the Domain Concentrator 3 corresponding to the each part, and sorts the information.

The Domain Concentrator 3 is a device that ties the ID to the network identification information of the Edge Concentrator 4 that manages the ID in a domain, and sorts the context information. The Domain Concentrator 3 and the below-described Edge Concentrator 4, Originator 5, sensor 6, Subscriber 8 (for example, corresponding to a target identification information reference reception section), and application 9 constitute one management domain.

The Domain Concentrator 3 is a computer device in the highest hierarchy of the hierarchical structure in one management domain, and the Domain Concentrator 3 manages any unique ID information registered in the management domain. The hierarchy just under the Domain Concentrator 3 is referred to as a management domain hierarchy. Thus, the Edge Concentrator 4 belongs to the management domain hierarchy of the Domain Concentrator 3.

The Edge Concentrator 4 is a device that ties the ID to the network identification information of the Subscriber 8 that is a terminal device of a context collector, and sorts the context information. In an example of the embodiment, a given ID is configured so that one Edge Concentrator in the management domain is in charge of sorting the context information of all the context collectors that collect the context information in the management domain by using the ID as a target to the Subscriber 8.

The Edge Concentrator 4 that sorts the context information for a given ID is referred to as a home Edge Concentrator of the ID, and the Edge Concentrator 4 that does not sort the context information is referred to as an external Edge Concentrator.

Further, in the hierarchy just under the Edge Concentrator 4, Originators 5 are disposed. The Originator 5 is a device that aggregates ID information read by the sensor 6 and transmits the aggregated ID information to the Edge Concentrator 4. The Subscriber 8 is connected to each Edge Concentrator 4 respectively.

By setting a notification rule from the Subscriber 8, the Originator 5 generates notification information and directly transmits the context information to the Subscriber 8 in accordance with the notification rule. In an example of the embodiment, the Originator 5 has a function to cache a correspondence relationship between the ID and an ALE-ID described below and add the ALE-ID to the notification information.

The sensor 6 is a sensor of an RFID reading device or the like. The RFID tag 7 is a device that reads the identification information and transmits it to the Originator 5. The identification information set to the target by the Subscriber 8 is referred to as target identification information. Since the identification information is stored in the RFID tag, the identification information is referred to as a tag, and the target identification information is referred to as a target tag.

A tag not set to the target by the Subscriber 8 is referred to as context identification information (or context tag). A tag set to the target by the Subscriber 8 of another domain is referred to as visitor identification information (or visitor tag). The RFID tag and the RFID reading device are an example, a device that transmits ID information and a device that receives the ID information may be any device.

The Subscriber 8 is a computer device that registers the target identification information and the network identification information of the Subscriber 8 in the Edge Concentrator 4 and collects the context identification information related to the target. In an example of the embodiment, the Subscriber 8 has a function to generate an ID binding message described below in order to request the above hierarchized Concentrators of a plurality of types to bind the IDs and perform binding processing. The application 9 is a program to determine a context from the context information collected by the Subscriber 8 and provide a service.

Since the information notified from the Originator 5 to the Subscriber 8 is information uniquely edited for the application, the notified information is referred to as an application level event (ALE), and the notification rule is referred to as an ALE specification.

The identification information of the network solved by a name resolution system used by the context information collection and distribution system S, which is used by the Concentrators so as to communicate with each other, is referred to as an ALE-ID, which means an ID used in a system that distributes application level events. An example of the name resolution system is DNS (Domain Name Service), JNDI (Java Naming and Directory Interface), and the like. "Java" is a registered trademark.

The above context information collection and distribution system S registers the read identification information in the computer device that controls the RFID tag reading device and is located in the lowest hierarchy in the wide area network topology. The computer device located in the lowest hierarchy in the wide area network topology notifies the computer device located in the higher management domain hierarchy that the computer device located in the lowest hierarchy manages the read target identification information.

Further, the computer device located in the management domain hierarchy notifies the computer device located in much higher ID system hierarchy that the computer device located in the hierarchy just under the management domain hierarchy manages the read target identification information. In this way, the computer devices of each node of the wide area network topology hierarchized in a tree structure know the position of the identification information.

By configuring the context information collection and distribution system S in this way, any Subscriber 8 in a large scale context collection system can efficiently and quickly refer to the context information indicating the position of the target and peripheral information around the target (information indicating what identification information is present around the target).

Figure 2:
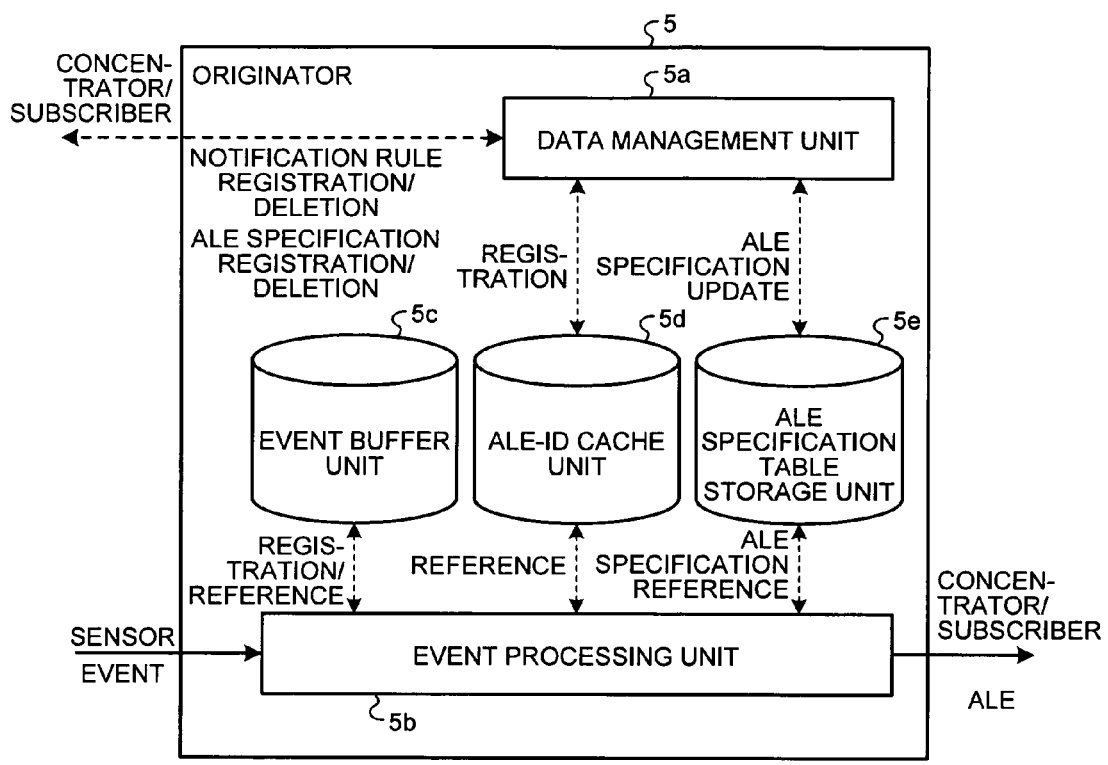
FIG. 2 is a functional block diagram illustrating a configuration of an Originator according to an example of the embodiment.

Next, a configuration of the Originator according to an example of the embodiment will be described. FIG. 2 is a functional block diagram illustrating the configuration of the Originator 5 according to an example of the embodiment. As illustrated in FIG. 2, the Originator 5 includes a data management unit 5a, an event processing unit 5b (for example, corresponding to an in-domain transmission section), an event buffer unit 5c, an ALE-ID cache unit 5d, and an ALE specification table storage unit 5e.

The data management unit 5a receives a setting request or a deletion request of the notification rule from the Subscriber 8, and registers or deletes the notification rule in or from an ALE specification table 5e1 (refer to FIG. 7) stored in the ALE specification table storage unit 5e. When registering the entry of the ALE specification table 5e1, the data management unit 5a registers a correspondence relationship between a filter ID (the ID set by the Subscriber 8 to the target) notified along with the ALE specification and the ALE-ID in the ALE-ID cache unit 5d.

When the entry is deleted from the ALE specification table 5e1, the data management unit 5a deletes the correspondence relationship between the corresponding filter ID and the ALE-ID from the ALE-ID cache unit 5d. When the event processing unit 5b receives a sensor event from the sensor 6, the event processing unit 5b registers the event in a corresponding entry of the event buffer unit 5c.

The sensor event includes a list of IDs and the identification information of the sensor. A specific example of the sensor event is, for example, message information defined in XML (eXtensible Markup Language) as illustrated in the table below.

TABLE 2

```
<?xml version="1.0" encoding="UTF-8"?>
<EventList>
    <Event>
        <Sensor>Sensor0</Sensor>
            <IdList>
                <ID>
                    <System>ER</System>
                    <RFID>ERD0001TESTOBJECT0001</RFID>
                </ID>
            <IdList>
    </Event>
</EventList>
```

When the event processing unit 5b registers the event in the event buffer unit 5c, while referring to the ALE specification table stored in the ALE specification table storage unit 5e, the event processing unit 5b refers to and edits the event information stored in the event buffer unit 5c, and generates an ALE.

Also, the event processing unit 5b refers to the ALE-ID cache unit 5d for all the IDs included in the ALE, and when there is an ALE-ID matching an ID, the event processing unit 5b adds the information to the ALE. A specific example of the ALE is message information defined in XML as illustrated in the table below.

TABLE 3

```
<?xml version="1.0" encoding="UTF-8"?>
<EventList>
    <Event>
        <Originator manager= 'Originator' ></Originator>
            <IdList senseBase="Sensor0">
                <ID aleid="Edge Concentrator1">
                    <System>ER</System>
                    <RFID>ERD0001TESTOBJECT0001</RFID>
                </ID>
            <IdList>
    </Event>
</EventList>
```

Figure 3A:
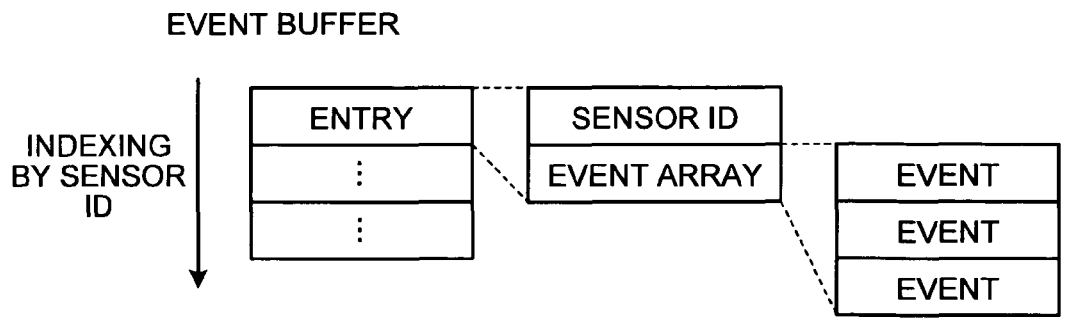
FIG. 3A is a diagram illustrating a data format of an event buffer stored in the Originator according to an example of the embodiment.

Next, a data format of data stored in the Originator according to an example of the embodiment will be described. FIG. 3A is a diagram illustrating the data format of the event buffer stored in the Originator according to an example of the embodiment.

The event buffer unit 5c has an entry for each sensor ID, and has a sensor ID and event array as information of the entry. The event array records past sensor event data within a predetermined array size, and when receiving a new sensor event data, the event array discards the oldest sensor event data in the array and adds the newest sensor event to the array.

Figure 3B:
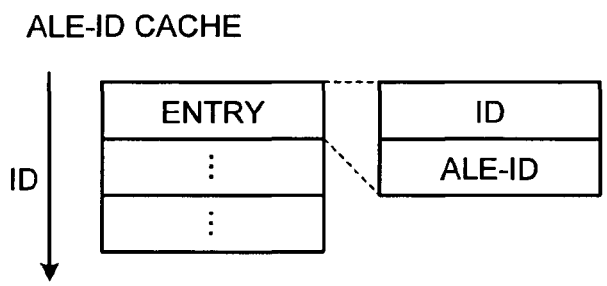
FIG. 3B is a diagram illustrating a data format of an ALE-ID cache stored in the Originator according to an example of the embodiment.
Figure 3C:
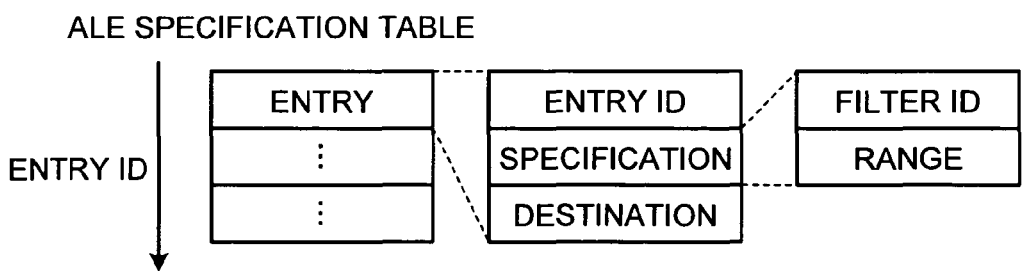
FIG. 3C is a diagram illustrating a data format of an ALE specification table stored in the Originator according to an example of the embodiment.

As illustrated in FIG. 3B, the ALE-ID cache unit 5d has an entry for each ID (target identification information), and has an ID and ALE-ID as information of the entry. As illustrated in FIG. 3C, the ALE specification table stored in the ALE specification table storage unit 5e has an entry for each entry ID, and has an entry ID, specification, and destination address as information of the entry.

The ALE specification includes a filter ID and range information. The range information is a condition to search the event buffer, and the range information indicates a sensor name to be searched and a search range of the event array. The destination address is the network identification information of the Subscriber 8 in which the ALE specification is registered.

The arrows illustrated in FIGS. 3A to 3C indicate destinations for searching the tables by using each ID as a key. A new entry is added in the order indicated by the direction of the arrows, and the oldest entry located at the top is deleted.

Figure 4:
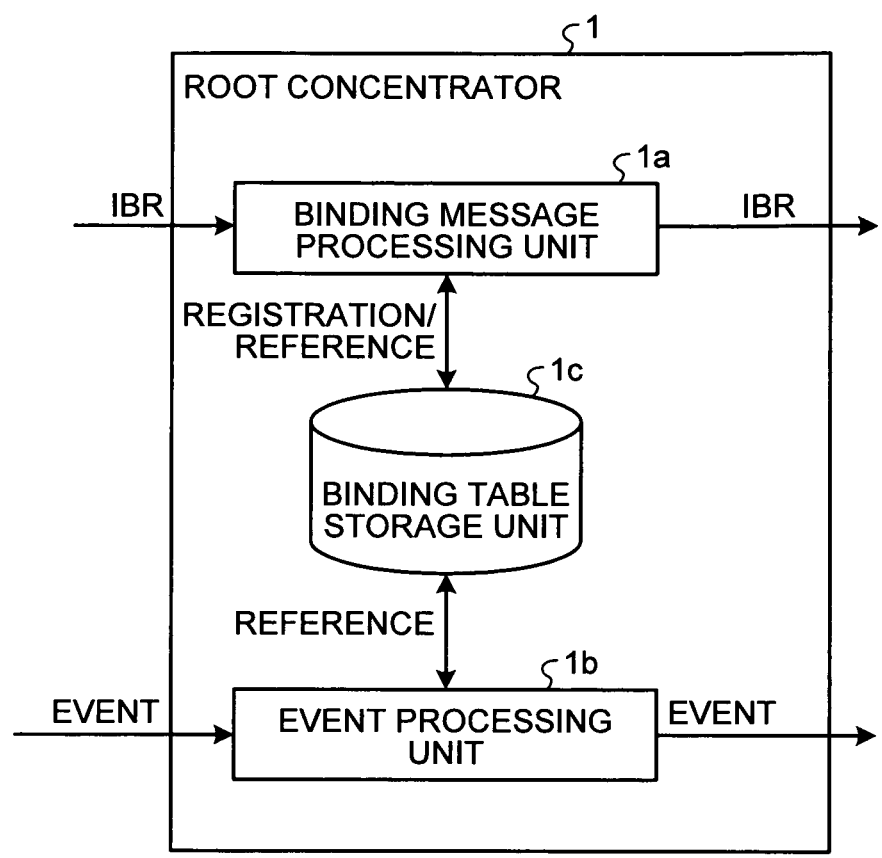
FIG. 4 is a functional block diagram illustrating a configuration of a Concentrator according to an example of the embodiment.

Next, a configuration of the Concentrator according to an example of the embodiment will be described. FIG. 4 is a functional block diagram illustrating the configuration of the Concentrator according to an example of the embodiment. Although there are a plurality of types of Concentrators such as the Root Concentrator 1, the ID System Concentrator 2, the Domain Concentrator 3, and the Edge Concentrator 4 according to the hierarchy in the context information collection and distribution system, the Concentrators share basic functional blocks with each other. Here the Root Concentrator 1 will be described as an example, while the differences among the Concentrators will be described below.

The Root Concentrator 1 includes a binding message processing unit 1a (for example, corresponding to an inter-domain transmission section when the Concentrator is the ID System Concentrator 2, and corresponding to a route transmission section when the Concentrator is the Root Concentrator 1), an event processing unit 1b, and a binding table storage unit 1c. The binding message processing unit 1a receives an ID binding message (hereinafter referred to as an IBR (ID Binding Request) message) from the Subscriber 8, a management console of an operator, or another Concentrator (Root Concentrator 1, ID System Concentrator 2, Domain Concentrator 3, or Edge Concentrator 4), and analyzes content of the IBR message.

When the IBR message has to be processed by the Concentrator, the binding message processing unit 1a stores a correspondence relationship between the ID and the network identification information of the computer device that requests to bind the ID in a binding table of the binding table storage unit 1c.

After storing information that should be stored in the binding table, the binding message processing unit 1a generates an ACK (Acknowledge) message and sends back the ACK message to the transmission source.

When the IBR message need not be processed by the Concentrator, the binding message processing unit 1a edits information of the IBR message in accordance with a predetermined processing sequence and transmits the edited information to an appropriate Concentrator.

A specific example of the IBR message is a message defined in XML as illustrated in the table below, and includes information such as a sequence number, an ID, a processing type, network identification information, and a global flag. The binding table and a sequence to register information in the binding table will be described below.

TABLE 4

<?xml version="1.0" encoding="UTF-8"?>
<IBR>
    <SN>Sequence number</SN>
    <ID aleid="">
        <System>ER</System>
        <RFID>D001ID1</RFID>
    </ID>

TABLE 4-continued

<TYPE>REGISTRATION</TYPE>
    <queueName>ID System Concentrator2</queueName>
    <GLOBAL>OFF</GLOBAL>
</IBR>

A specific example of the ACK message responding to the IBR message is a message defined in XML as illustrated in the table below.

TABLE 5

<?xml version="1.0" encoding="UTF-8"?>
<IBR>
    <SN>Sequence number</SN>
    <ID aleid="">
        <System>ER</System>
        <RFID>D001ID1</RFID>
    </ID>
    <TYPE>ACK</TYPE>
    <queueName>Domain Concentrator2</queueName>
    <GLOBAL>OFF</GLOBAL>
</IBR>

The event processing unit 1b receives an event from the Originator 5 or another Concentrator (Root Concentrator 1, ID System Concentrator 2, Domain Concentrator 3, or Edge Concentrator 4), extracts ID information included in the event, refers to the binding table stored in the binding table storage unit 1c, and transmits the event. The data format of the event is the same as that of the data of the sensor event illustrated above (Table 2). The ALE outputted corresponding to the event is the same as the data of the ALE illustrated above (Table 3).

Figure 5:
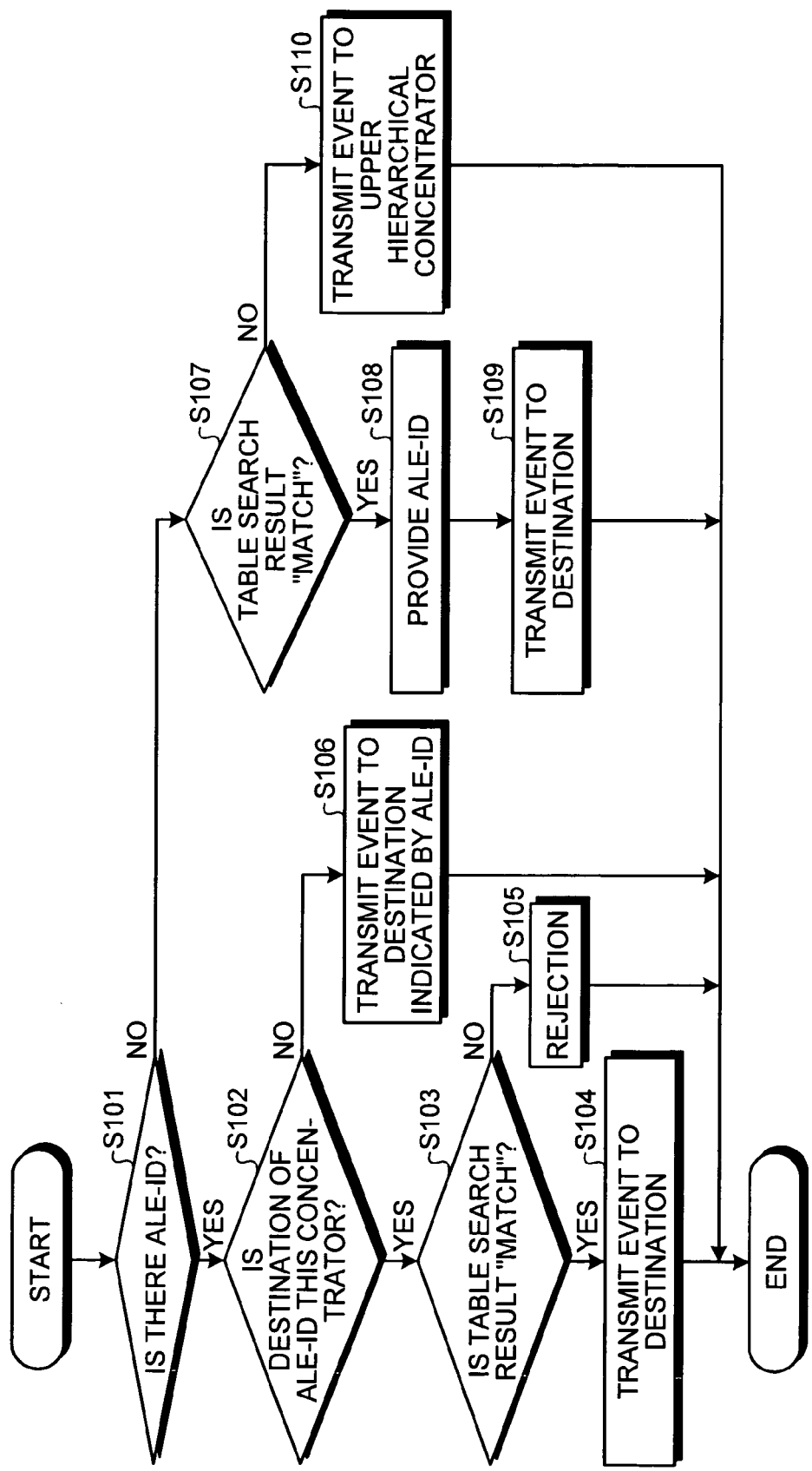
FIG. 5 is a flowchart illustrating an event processing procedure performed in the Concentrator according to an example of the embodiment.

Next, event processing performed in a Concentrator according to an example of the embodiment will be described. FIG. 5 is a flowchart illustrating an event processing procedure performed in the Concentrator according to an example of the embodiment. Here, the processing will be described also by using the Root Concentrator 1 as a representative example.

As illustrated in FIG. 5, first, in step S101, when the event processing unit 1b receives an event, the event processing unit 1b extracts the ID information from the event, and checks whether or not the ALE-ID is set. If the ALE-ID is set (step S101: Yes), the process proceeds to step S102. If the ALE-ID is not set (step S101: No), the process proceeds to step S107.

In step S102, the event processing unit 1b checks whether or not the network identification information, which is the destination address illustrated by the ALE-ID, indicates the Concentrator. If the network identification information indicates the Concentrator (step S102: Yes), the process proceeds to step S103. If the network identification information does not indicate the Concentrator (step S102: No), the process proceeds to step S106.

In step S103, the event processing unit 1b searches the binding table stored in the binding table storage unit 1c by using the ID as a key. If there is a corresponding entry (search result: match, step S103: Yes), the process proceeds to step S104. If there is no corresponding entry (search result: no match, step S103: No), the process proceeds to step S105.

In step S104, the event processing unit 1b forwards the event to the destination address, and ends the event processing. In step S105, the event processing unit 1b rejects the event, and ends the event processing.

In step S106, the event processing unit 1b transmits the event to a Concentrator that has the network identification information indicated by the ALE-ID, and ends the event processing. In step S107, the event processing unit 1b searches the binding table by using the ID as a key. If there is a corresponding entry (search result: match, step S107: Yes), the process proceeds to step S108. If there is no corresponding entry (search result: no match, step S107: No), the process proceeds to step S110.

In step S108, the event processing unit 1b sets the ALE-ID of the Concentrator that currently performs processing as an attribute of the ID information of the event. Then, the event processing unit 1b transmits the event along with the ALE-ID to the destination address (step S109), and ends the event processing. In step S110, the event processing unit 1b transmits the event to an upper hierarchical Concentrator registered by default, and ends the event processing.

Figure 6:
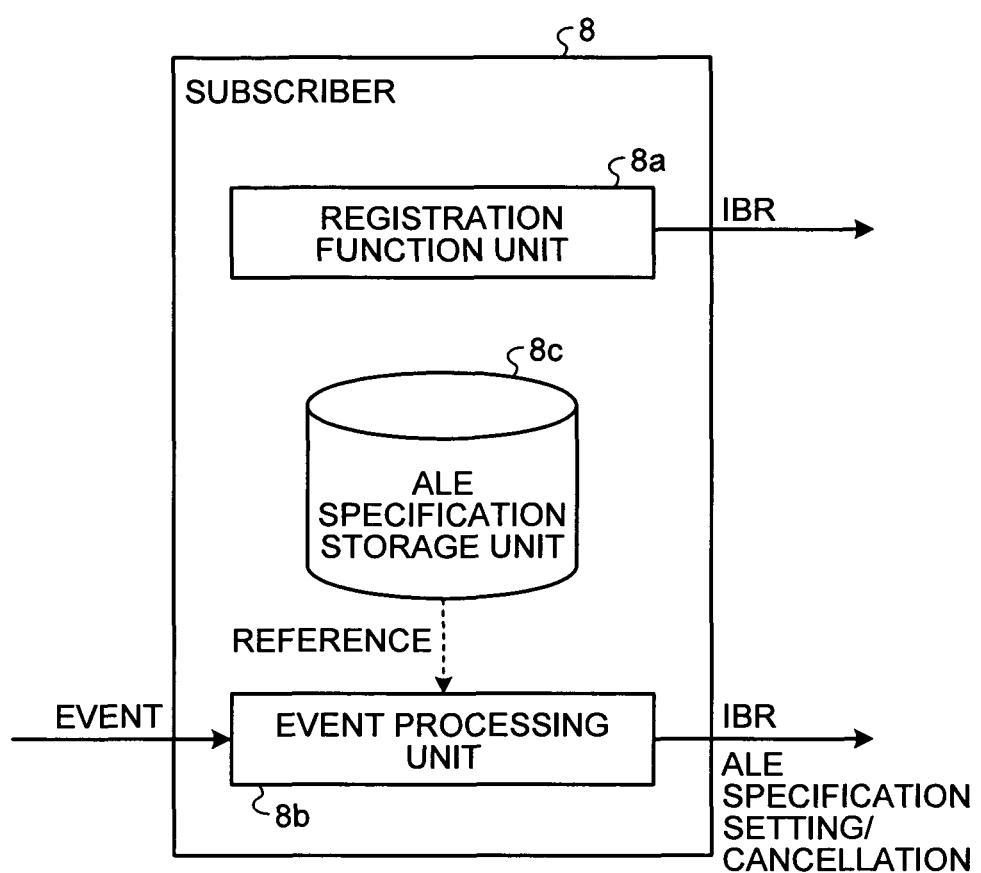
FIG. 6 is a functional block diagram illustrating a configuration of a Subscriber according to an example of the embodiment.

Next, a configuration of the Subscriber according to an example of the embodiment will be described. FIG. 6 is a functional block diagram illustrating the configuration of the Subscriber according to an example of the embodiment. Subscriber 8 includes a registration function unit 8a, an event processing unit 8b, and an ALE specification storage unit 8c.

The registration function unit 8a specifies a target by converting the ID specified by an instruction from the application 9 into the ID binding message (IBR) as illustrated in the table below and transmitting the IBR to the Edge Concentrator 4.

TABLE 6

```
<?xml version="1.0" encoding="UTF-8"?>
<IBR>
    <SN>Sequence number</SN>
    <ID aleid="">
        <System>ER</System>
        <RFID>ERD0001TESTOBJECT0001</RFID>
    </ID>
    <TYPE>REGISTRATION</TYPE>
    <queueName>ID System Concentrator2</queueName>
    <GLOBAL>OFF</GLOBAL>
</IBR>
```

When the event processing unit 8b receives an event from the Edge Concentrator 4, the event processing unit 8b notifies the application 9 that the event processing unit 8b receives the event, and transmits the ALE specification setting request in XML format as illustrated in the table below to the Originator 5 notified by the event.

TABLE 7

```
<?xml version="1.0" encoding="UTF-8"?>
<IBR>
    <SN>Sequence number</SN>
    <ID aleid="">
        <System>ER</System>
        <RFID>ERD0001TESTOBJECT0001</RFID>
    </ID>
    <TYPE>REGISTRATION</TYPE>
    <queueName>subscriber</queueName>
    <GLOBAL>OFF</GLOBAL>
</IBR>
```

The event processing unit 8b cancels the specification of the target by transmitting Disconnect of the IBR to the Edge Concentrator 4. In this case, the event processing unit 8b transmits an ALE specification cancel request in which "Disconnect" is set to the setting item of "<Type>" tag of the above (table 7) to the Edge Concentrator 4.

When the event processing unit 8b receives an event from the Originator 5, the event processing unit 8b notifies the application 9 that the event processing unit 8b receives the event.

Figure 7:
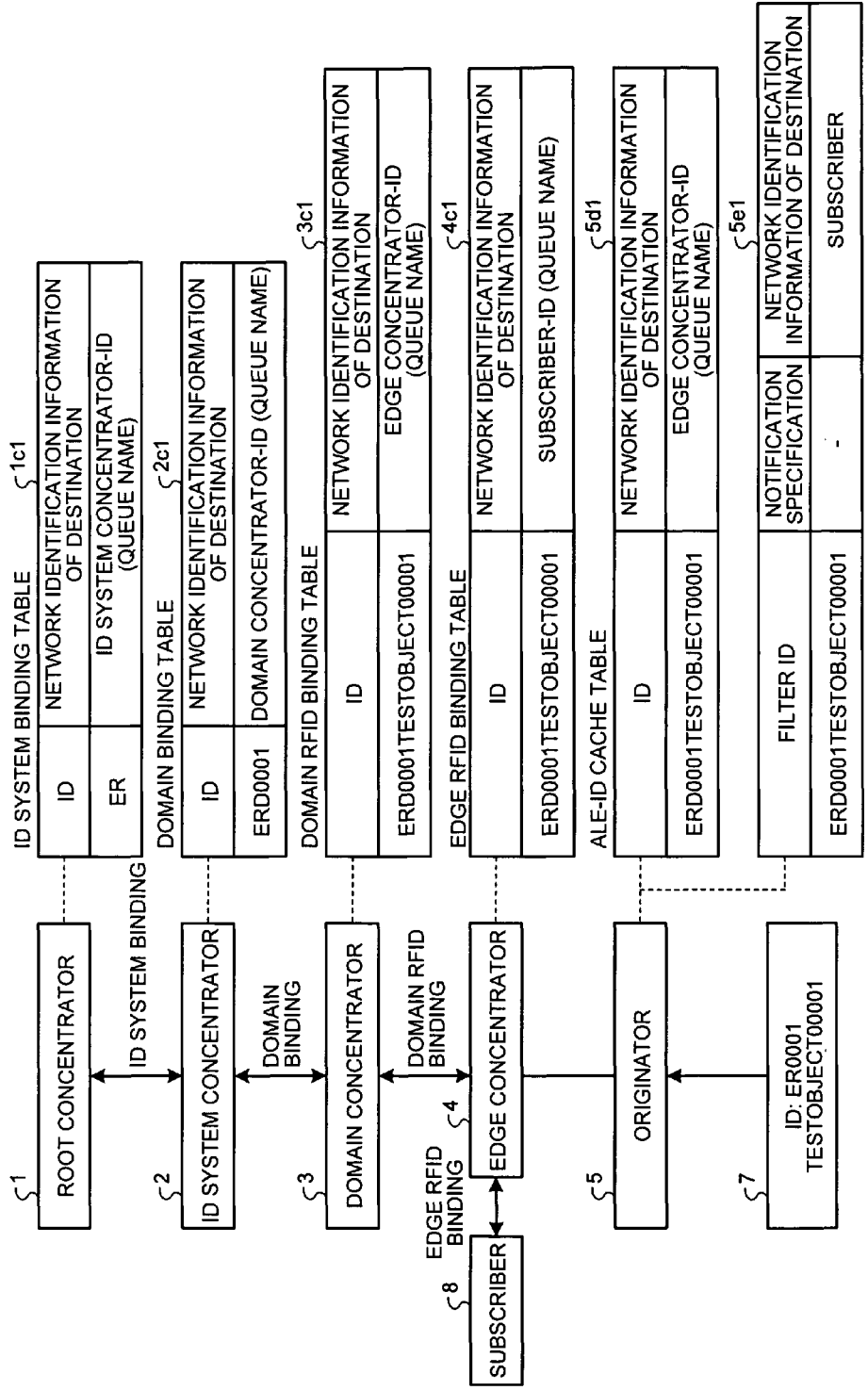
FIG. 7 is a diagram illustrating an example of an ID binding table corresponding to an ID system in each device according to an example of the embodiment.

Next, the ID binding table corresponding to the ID system in each device according to an example of the embodiment will be described. FIG. 7 is a diagram illustrating an example of the ID binding table corresponding to the ID system in each device according to an example of the embodiment.

As described above (table 1), the ID is assumed to have unique topology to identify an administrator and a type for each ID system. As an example, the ID is constituted by code identification+company code+product code+serial number, and a company and a type of the product can be uniquely identified by the code identification+company code+product code, without the serial number.

An example of the ID system is illustrated above (table 1). The ID system is constituted by, for example, a prefix "ER" that is identification information of the ID system, an ASCII code of 5 characters that is domain identification information, an ASCII code of 10 characters that is object identification information, and an ASCII code of 5 characters that is a serial number. A description example of such an ID system is "ERD0001TESTOBJECT00001".

A correspondence table between the ID managed by the Concentrator and the network identification information of a reception device of an event including the ID is referred to as the binding table. As illustrated in FIG. 7, there are binding tables of the types described below.

(1) An ID system binding table 1c1 manages binding of ID system identification information of the ID and the network identification information of the ID System Concentrator 2. The network identification information is a name of a queue that receives the event when a message service is used to transmit/receive events. The ID system binding table 1c1 is managed by the Root Concentrator 1, and registered when the ID system of the target ID is used globally in the context information collection and distribution system S. When an integrated ID system is used in the context information collection and distribution system, the Root Concentrator 1 is not necessary.

(2) A domain binding table 2c1 manages binding of a domain portion indicated by the ID system and the network identification information of the Domain Concentrator 3. The domain binding table is managed in the ID System Concentrator 2. An operator of the context information collection and distribution system S registers a domain portion of the ID managed by the Domain Concentrator 3. The domain binding will be described in detail below.

(3) A domain RFID binding table 3c1 manages binding of the ID and the network identification information of the Edge Concentrator 4 for a local registration. Also, the domain RFID binding table 3c1 manages binding of the ID and the network identification information of the Domain Concentrator 3 that is a global request registration source for a global registration.

An operator of the context information collection and distribution system S registers an ID managed in the management domain, and selects a home Edge Concentrator that manages the ID. Concerning load distribution, in the selection, the context information collection and distribution system S may automatically select an appropriate Edge Concentrator 4, or an operator may manually set an appropriate Edge Concentrator 4.

(4) An Edge RFID binding table 4c1 manages binding of the ID and the network identification information of the Subscriber 8. This binding table is managed in the Edge Concentrator 4. The Subscriber 8 registers binding information by the ID binding message (IBR).

(5) Although an ALE-ID cache table 5d1 is not a binding table technically, the ALE-ID cache table 5d1 is used for the Originator 5 to hold a correspondence table between the ALE-ID used to control event transmission to an upper hierarchical Concentrator described below and the ID.

(6) The ALE (application level event, ALE: Application Level Event) is information edited uniquely for an application, and information to be notified and a notification rule are referred to as an ALE specification. The ALE specification table 5e1 is a table to store the ALE specification.

Figure 8:
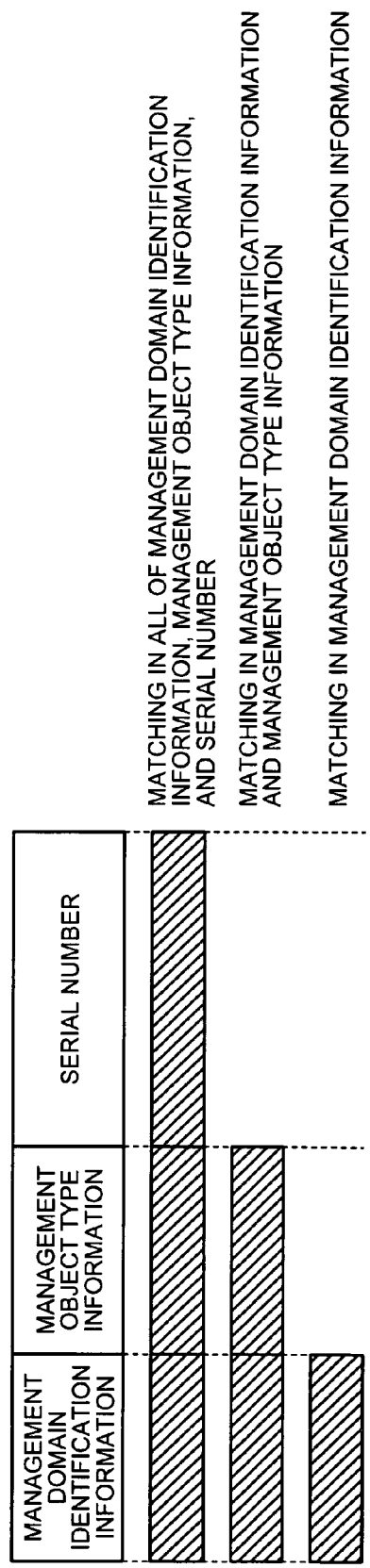
FIG. 8 is a diagram illustrating an ID search method in a domain binding according to an example of the embodiment.

Next, an ID search method in the domain binding according to an example of the embodiment will be described. FIG. 8 is a diagram illustrating the ID search method in the domain binding according to an example of the embodiment. Topology of the ID for determining a domain is different for each ID system. The domain binding specifies a portion configuring topology of the ID, and the domain is determined by making the remaining portion of the ID a wild card.

As a search method of the domain, a longest match is commonly used. However, in an example of the embodiment, an ID index of the Concentrator is used. As an example of a method to simply realize wild card processing without sacrificing high-speed performance of transmission (routing processing) of the context information including the target identification information, as illustrated in FIG. 8, there is a method in which the ID system is divided into three parts "management domain identification information, management object type information, and a serial number", a search is performed for each combination thereof, and ID comparison is performed three times for the indexes by the longest match.

Although the bit lengths of the management domain identification information, the management object type information, and the serial number (five ASCII characters in the illustrated ID system) are fixed lengths, these lengths are variable depending on the ID system, and the bit lengths of the divided parts to be compared may be set variable by the initial setting.

Although there is a complex ID system in which the bit length of a divided part of a later stage is determined by a divided part of an earlier stage, it is obvious that configuring search logic of the domain binding in accordance with topology of the ID system for each ID system is included in an example of the embodiment.

Figure 9:
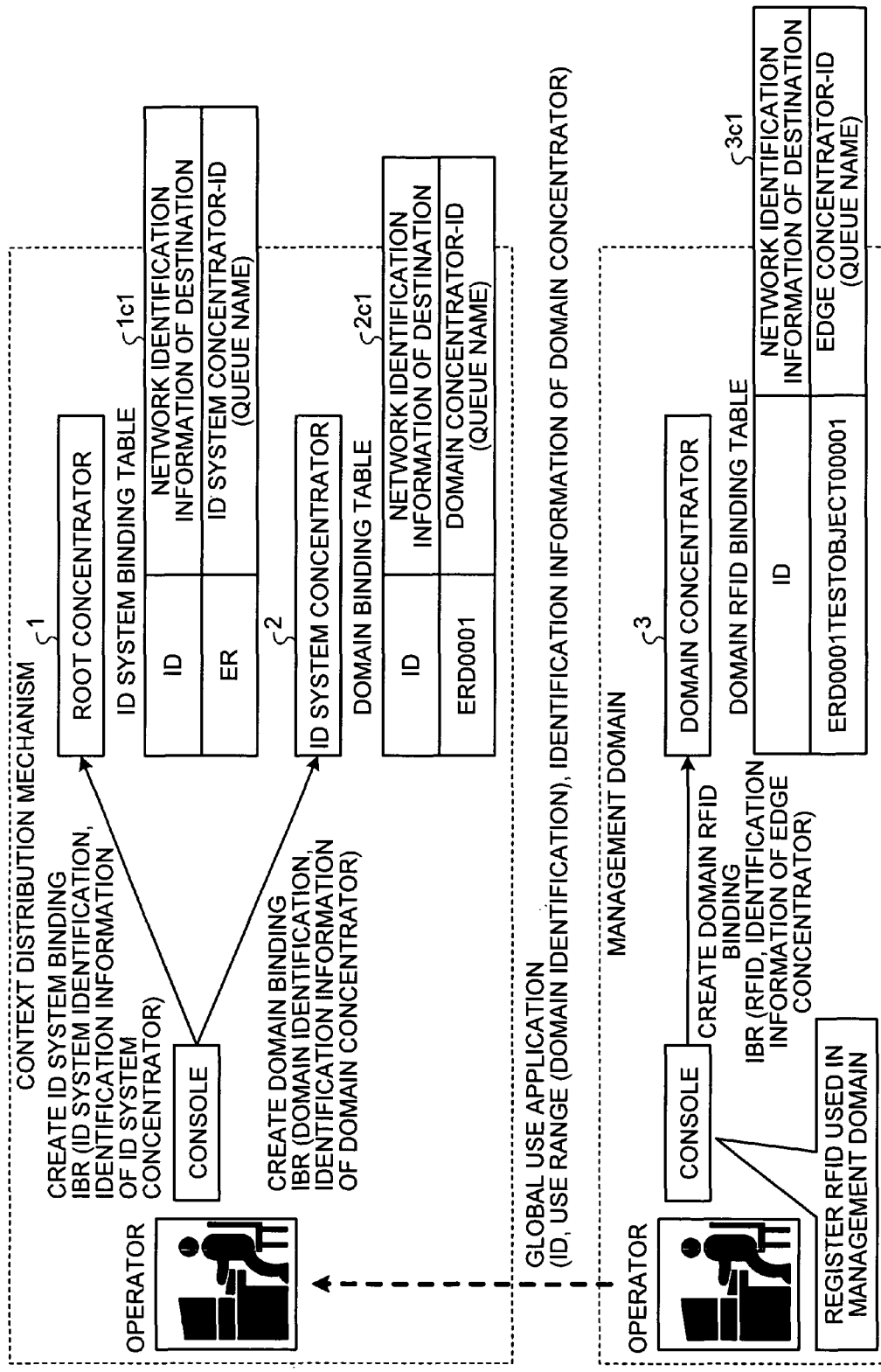
FIG. 9 is a diagram illustrating an outline of processing to register an ID in each device according to an example of the embodiment.

Next, processing to register the ID in each device according to an example of the embodiment will be described. FIG. 9 is a diagram illustrating an outline of the processing to register the ID in each device according to an example of the embodiment. Hereinafter, a registration method when a target is an ID "ERD0001TESTOBJECT00001" will be described by using a registration sequence.

An operation to make domain RFID binding in the Domain Concentrator 3 is referred to as local registration. Registration of routing information (correspondence relationship between the ID and the network identification information) in the Concentrator is performed by the ID binding message (IBR). It is assumed that an IBR is inputted from a terminal device by an operator. The Subscriber 8 can join the context information collection and distribution system S by requesting an IBR from an upper hierarchical Concentrator by plug-in like processing.

As illustrated in FIG. 9, an operator of the management domain registers an ID "ERD0001TESTOBJECT00001" monitored in the management domain in the Domain Concentrator 3. Further the operator or the Domain Concentrator 3 determines a home Edge Concentrator of the ID, and registers the home Edge Concentrator and the network identification information of the determined Edge Concentrator 4 in the Domain Concentrator 3.

When the operator of the management domain desires that an event including an ID is transmitted even when the ID is detected in another domain, the operator of the context information collection and distribution system S registers the domain identification information "ERD0001" and the network identification information of the Domain Concentrator 3 in the ID System Concentrator 2 that manages (prefix+ domain identification information) of the ID.

Subsequently, the operator of the context information collection and distribution system S registers the ID system identification information of the ID "ER" and the network identification information of the ID System Concentrator 2 in the Root Concentrator 1. When there is no ID System Concentrator 2 that manages an ID system of RFID registered globally, the operator of the context information collection and distribution system S assigns a corresponding ID System Concentrator 2 and registers an ID System binding in the Root Concentrator 1.

Figure 10:
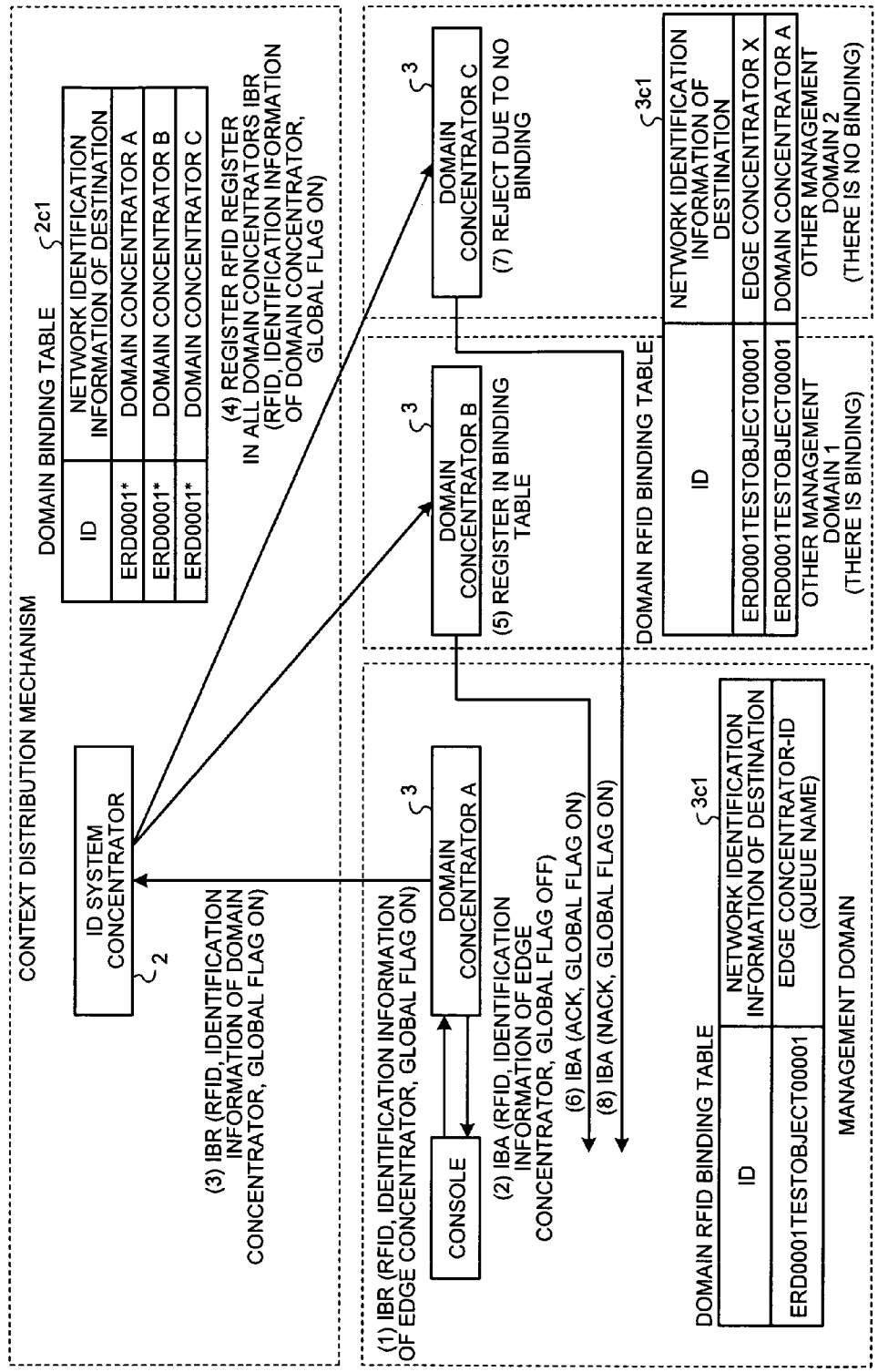
FIG. 10 is a diagram illustrating an outline of registration processing of global binding in a Root Concentrator according to an example of the embodiment.

Next, registration processing of the global binding in the Root Concentrator according to an example of the embodiment will be described. FIG. 10 is a diagram illustrating an outline of registration processing of the global binding in the Root Concentrator according to an example of the embodiment. Hereinafter, a registration method when information is distributed between the management domains by setting an ID "ERD0001TESTOBJECT00001" as a target is will be described by using a registration sequence.

To refer to the same RFID in a plurality of domains, the global binding needs to be created. (1) First, the operator of the context information collection and distribution system S registers an ID "ERD0001TESTOBJECT00001" in a Domain Concentrator A by the IBR message in which a global flag is set to ON.

(2) Subsequently, in the same manner as illustrated in FIG. 9, the Domain Concentrator A performs a local registration in the domain, returns the IBR in which the global flag is set to OFF, and then transmits a local registration completion notification.

(3) Subsequently, the Domain Concentrator A transmits the IBR message to the ID System Concentrator 2 because the IBR message is the global registration. (4) Subsequently, the ID System Concentrator 2 transmits the IBR message to all the Domain Concentrators that refer to the ID by referring to the domain binding table 2c1.

Here, it is assumed that there are three entries that are identified by "ERD0001" in the domain binding table 2c1. Since the request source of the IBR is the Domain Concentrator A, the ID System Concentrator 2 transmits the IBR message to the Domain Concentrator B and the Domain Concentrator C that are the destination addresses of the other two entries.

(5) Subsequently, it is assumed that there is an entry (entry of a pair of "ERD0001TESTOBJECT00001" and Edge Concentrator in the domain RFID binding table 3c1) of the ID included in the IBR message in the Domain Concentrator B (or the Domain Concentrator C) among the Domain Concentrators.

In this case, a pair of "ERD0001TESTOBJECT00001" and the network identification information of Edge Concentrator X is registered as an entry of the global binding in the domain RFID binding table 3c1. (6) An IBA in which the global flag is set to ON is transmitted to a console identified by the network identification information according to registration content in the domain RFID binding table 3c1.

(7) If there is not an entry of the ID included in the IBR message in the Domain Concentrator C, there is not the domain RFID binding in the domain RFID binding table 3c1, so that the global registration is not performed.

(8) In this case, an IBA in which the global flag is set to ON and NACK (not acknowledged) is set is transmitted to a console identified by the network identification information according to the registration content in the domain RFID binding table 3c1.

Figure 11:
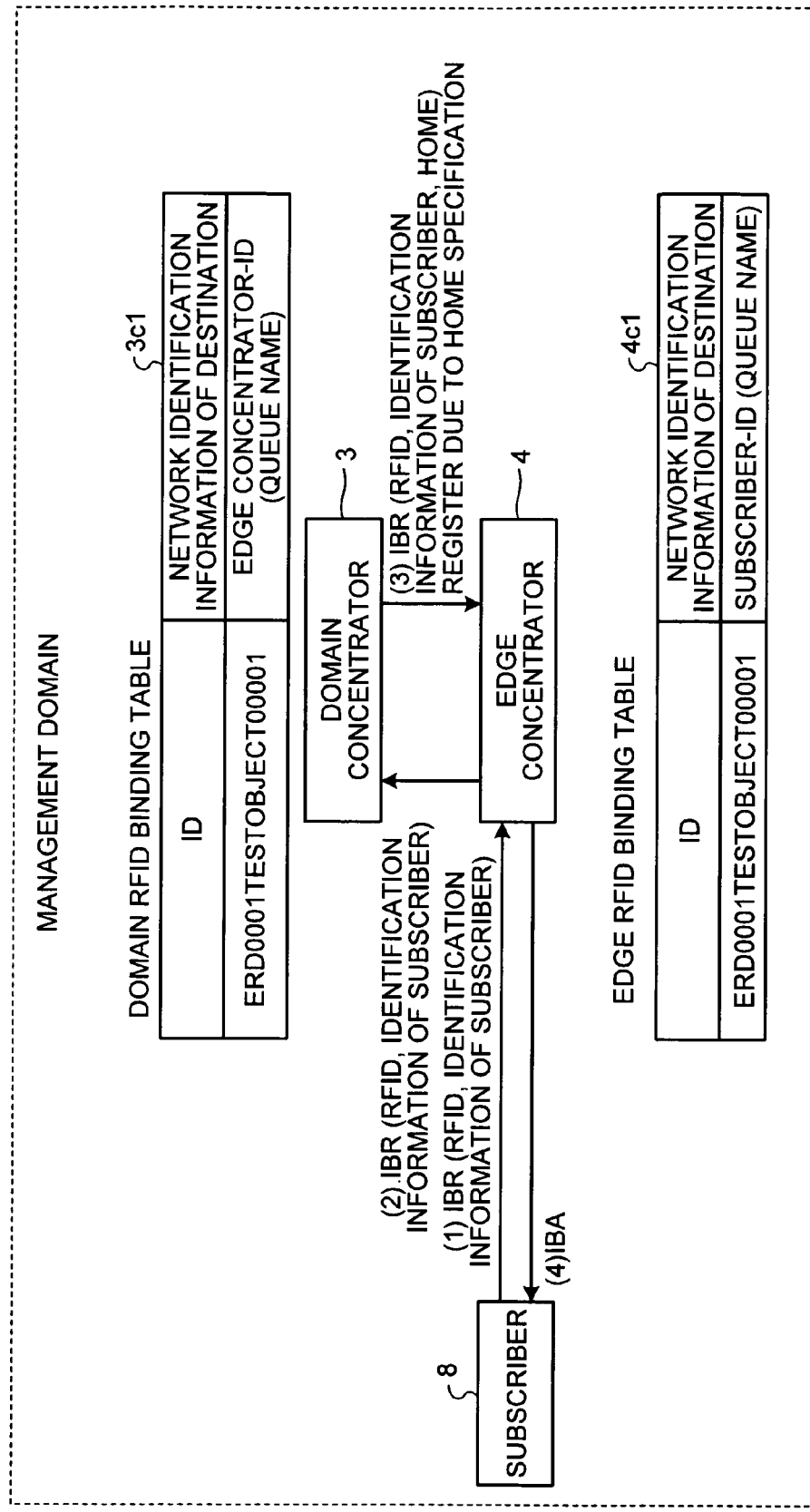
FIG. 11 is a diagram illustrating an outline of registration processing of domain binding (when not globally bound) in an Edge Concentrator according to an example of the embodiment.

Next, an outline of the registration processing of the domain binding (when not globally bound) in the Edge Concentrator according to an example of the embodiment will be described. FIG. 11 is a diagram illustrating the outline of the registration processing of the domain binding (when not globally bound) in the Edge Concentrator according to an example of the embodiment. Hereinafter, a registration method when the Subscriber 8 specifies an ID "ERD0001TESTOBJECT00001" as a target by using a registration sequence.

(1) First, the Subscriber 8 transmits an IBR of a desired ID "ERD0001TESTOBJECT00001" to a nearby Edge Concentrator other than the Edge Concentrator 4, and creates an Edge RFID binding.

(2) Then, the Edge Concentrator near the Subscriber 8 searches the Edge RFID binding table by using the ID "ERD0001TESTOBJECT00001" as a key. However, there is not a corresponding entry, and thus the Edge Concentrator transmits the IBR to the Domain Concentrator 3.

(3) Then, the Domain Concentrator 3 searches the domain RFID binding table 3c1 by using the ID "ERD0001TESTOBJECT00001" as a key. Since there is an entry, the Domain Concentrator 3 transmits the IBR to the Edge Concentrator 4 that is a home.

(4) Then, the Edge Concentrator 4 creates an Edge RFID binding specified by the transmitted IBR in the Edge RFID binding table 4c1, and returns an IBA message (IBA message in which ACK is set) to the Subscriber 8.

Figure 12:
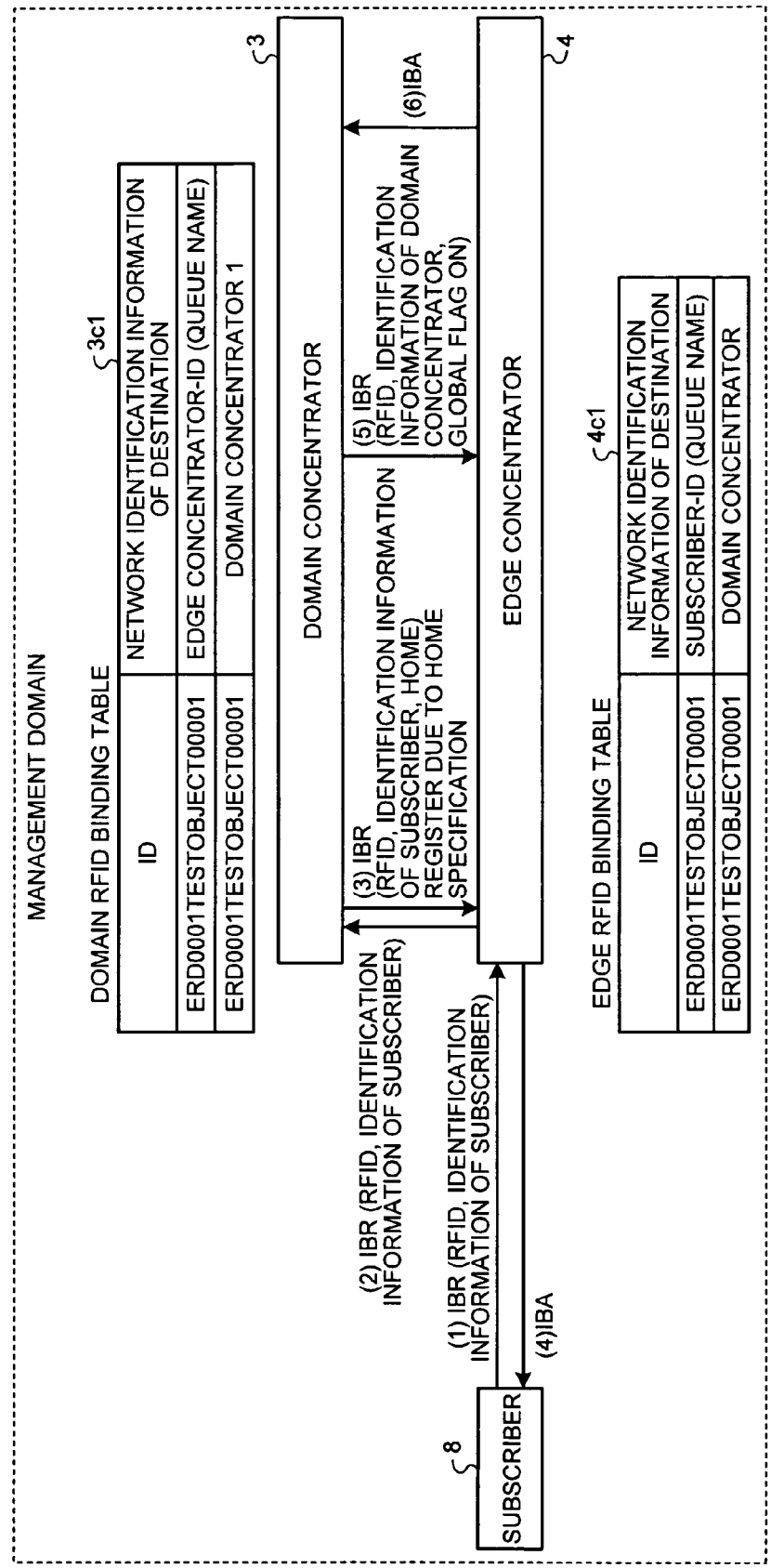
FIG. 12 is a diagram illustrating an outline of registration processing of domain binding (when globally bound) in the Edge Concentrator according to an example of the embodiment.

Next, an outline of the registration processing of the domain binding (when globally bound) in the Edge Concentrator according to an example of the embodiment will be described. FIG. 12 is a diagram illustrating the outline of the registration processing of the domain binding (when globally bound) in the Edge Concentrator according to an example of the embodiment. Hereinafter, a registration method when the Subscriber 8 specifies an ID "ERD0001TESTOBJECT00001" as a target by using a registration sequence.

(1) First, the Subscriber 8 transmits an IBR to a nearby Edge Concentrator other than the Edge Concentrator 4, and creates an Edge RFID binding of a desired ID "ERD0001TESTOBJECT00001".

(2) Then, the Edge Concentrator near the Subscriber 8 searches the Edge RFID binding table by using the ID "ERD0001TESTOBJECT00001" as a key. However, there is not a corresponding entry, and thus the Edge Concentrator transmits the IBR to the Domain Concentrator 3.

(3) Then, the Domain Concentrator 3 searches the domain RFID binding table 3c1 by using the ID "ERD0001TESTOBJECT00001" as a key. Since there is an entry, the Domain Concentrator 3 transmits the IBR to the Edge Concentrator 4 that is a home.

(4) Then, the Edge Concentrator 4 creates an Edge RFID binding specified by the IBR in the Edge RFID binding table 4c1, and returns an IBA message to the Subscriber 8.

(5) Subsequently, since there is a global registration entry (an entry of a pair of "ERD0001TESTOBJECT00001" and the Domain Concentrator1) for the ID "ERD0001TESTOBJECT00001" in the domain RFID binding table 3c1 of the Domain Concentrator 3, an IBR message in which the ID "ERD0001TESTOBJECT00001" and the network identification information of the Domain Concentrator 3 are included and the global flag is set to ON is created and transmitted to the Edge Concentrator 4.

(6) Then, the Edge Concentrator 4 creates an entry of a pair of the ID "ERD0001TESTOBJECT00001" and the network identification information of the Domain Concentrator 1 in the Edge RFID binding table 4c1, and returns an IBA message to the Domain Concentrator 3.

Figure 13:
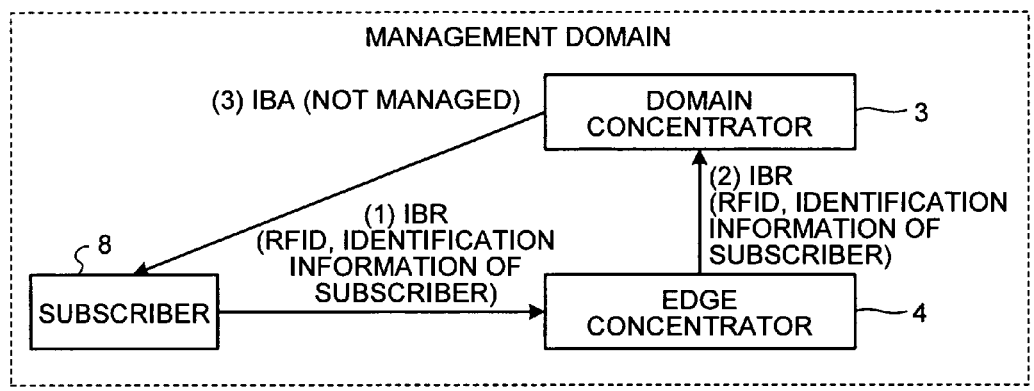
FIG. 13 is a diagram illustrating an outline of registration processing of domain binding (when not domain-bound) in the Edge Concentrator according to an example of the embodiment.

Next, an outline of the registration processing of the domain binding (when not domain-bound) in the Edge Concentrator according to an example of the embodiment will be described. FIG. 13 is a diagram illustrating the outline of the registration processing of the domain binding (when not domain-bound) in the Edge Concentrator according to an example of the embodiment. Hereinafter, a registration method when the Subscriber 8 specifies an ID "ERD0001TESTOBJECT00001" as a target by using a registration sequence.

(1) First, the Subscriber 8 transmits an IBR of a desired ID "ERD0001TESTOBJECT00001" to a nearby Edge Concentrator 4.

(2) Then, the Edge Concentrator 4 searches the Edge RFID binding table 4c1 by using the ID "ERD0001TESTOBJECT00001" as a key. However, there is not a corresponding entry, and thus the Edge Concentrator 4 transmits the IBR to the Domain Concentrator 3.

(3) Then, the Domain Concentrator 3 searches the domain RFID binding table 3c1 by using the ID "ERD0001TESTOBJECT00001" as a key. However, there is not a corresponding entry, and thus the Domain Concentrator 3 transmits an IBA message including "a code not to be managed" to the Subscriber 8.

Figure 14:
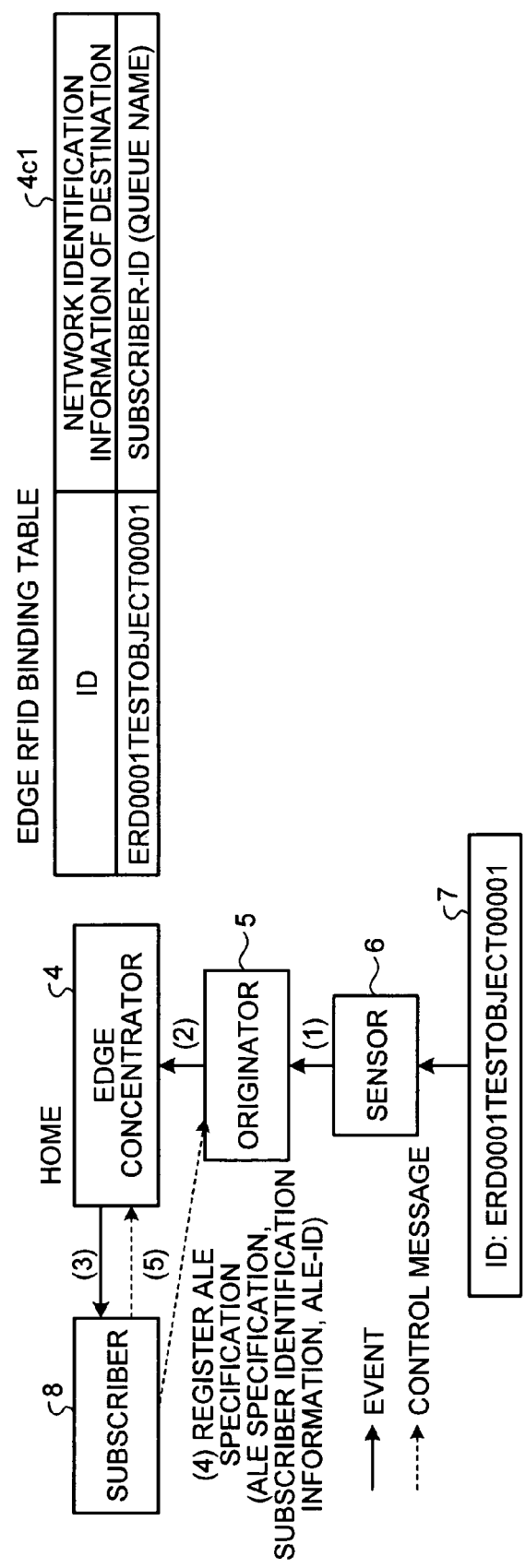
FIG. 14 is a diagram illustrating an outline of routing processing (when sending an initial event) of the Edge Concentrator in which a domain binding is present in the same domain.

Next, an outline of routing processing (when sending an initial event) of the Edge Concentrator in which a domain binding is present in the same domain will be described. FIG. 14 is a diagram illustrating the outline of the routing processing (when sending an initial event) of the Edge Concentrator in which a domain binding is present in the same domain. Here, it is assumed that an Edge RFID binding has already been registered.

In FIG. 14, an outline of an operation will be described in which when the sensor 6 in the management domain detects a monitored ID "ERD0001TESTOBJECT00001", information including the ID is transmitted to the Subscriber 8 that refers to the ID in the management domain.

(1) First, the sensor 6 detects an RFID tag 7 having an ID of "ERD0001TESTOBJECT00001". The sensor 6 transmits a sensor event including the ID to the Originator 5. An example of the sensor event is the same as that illustrated in the above (table 2).

(2) Then, since an ALE specification related to "ERD0001TESTOBJECT00001" is not set in the Originator 5, an event including the ID is transmitted to the Edge Concentrator 4. An example of the event transmitted from the Originator 5 to the Edge Concentrator 4 is the same as that illustrated in the above (table 3).

(3) Then, the Edge Concentrator 4 searches the Edge RFID binding table 4c1 by using "ERD0001TESTOBJECT00001" as a key. Since there is a binding of the ID and the Subscriber 8, an event (refer to the above (table 3)) is transmitted to the Subscriber 8.

(4) Then, the Subscriber 8 registers an ALE specification and an ALE-ID in the Originator 5 which is notified by the event and is the generation source of the event. The ALE specification is, for example, a filter (notification rule) ID "ERD0001TESTOBJECT00001", sensor identification information "sensor A", a space range "1 (only the sensor)", and a time range "1 (only a newest event data)". The ALE-ID is, for example, an ALE-ID "Edge Concentrator".

(5) Then, the Subscriber 8 deactivates the Edge RFID binding by transmitting an IBR (Disconnect) as illustrated in the table below to the Edge Concentrator 4.

TABLE 8

```
<?xml version="1.0" encoding="UTF-8"?>
<IBR>
    <SN>Sequence number</SN>
    <ID aleid="">
        <System>ER</System>
        <RFID>ERD0001TESTOBJECT0001</RFID>
    </ID>
    <TYPE>DISCONNECT</TYPE>
    <queueName>subscriber</queueName>
    <GLOBAL>OFF</GLOBAL>
</IBR>
```

Figure 15:
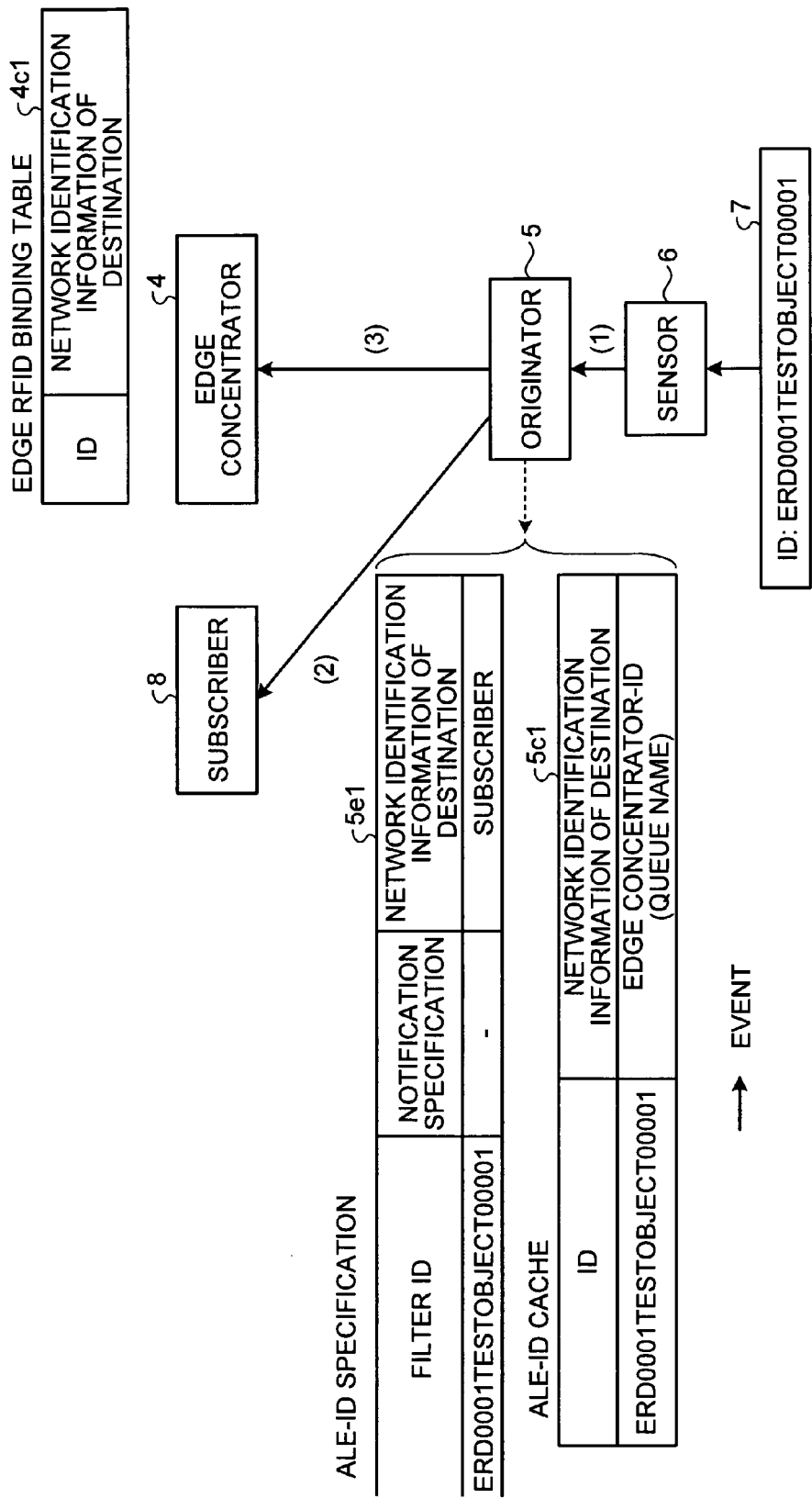
FIG. 15 is a diagram illustrating an outline of routing processing (after setting ALE) of the Edge Concentrator for which a domain binding is present in the same domain.

Next, an outline of routing processing (after setting ALE) of the Edge Concentrator in which a domain binding is present in the same domain will be described. FIG. 15 is a diagram illustrating the outline of the routing processing (after setting ALE) of the Edge Concentrator in which a domain binding is present in the same domain.

(1) First, the sensor 6 detects an RFID tag 7 having an ID of "ERD0001TESTOBJECT00001". The sensor 6 transmits a sensor event including the ID to the Originator 5. When the sensor 6 detects a wireless tag periodically, the sensor event is generated periodically.

(2) Then, since an ALE specification related to "ERD0001TESTOBJECT00001" is set in the Originator 5, an ALE including the ID is transmitted to the Subscriber 8 on the basis of the ALE specification.

(2) Then, the Originator 5 transmits an initial event in which the ID "ERD0001TESTOBJECT00001" is converted into an ALE-ID "Edge Concentrator" on the basis of a cache content of the ALE-ID cache to the Edge Concentrator 4. The Edge Concentrator 4 determines that the Edge Concentrator 4 is an ID that manages the Edge RFID binding from the ALE-ID, and searches the Edge RFID binding table 4c1 by using "ERD0001TESTOBJECT00001" as a key. Since the corresponding entry is deleted in the processing of (5) in FIG. 14, the event is rejected.

Figure 16:
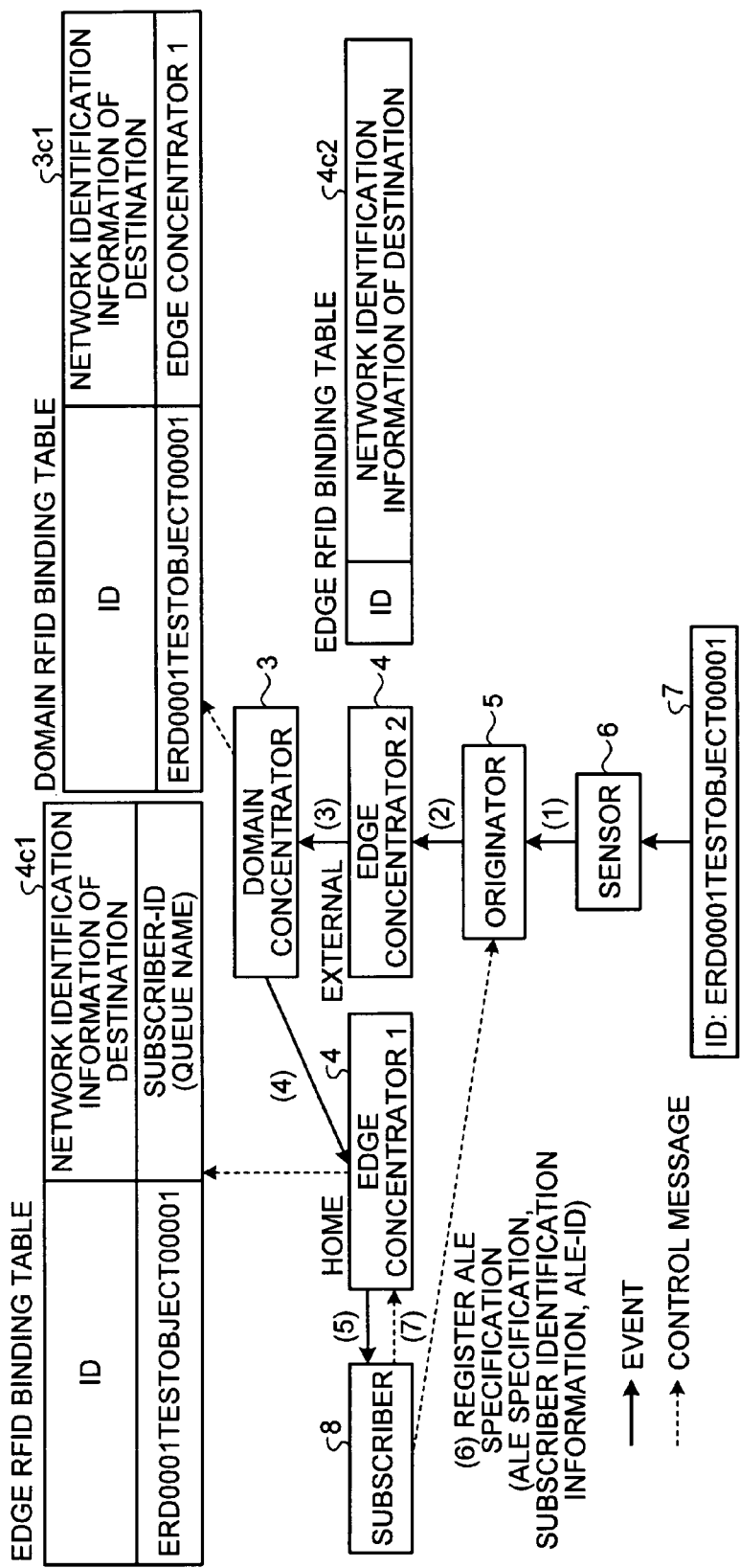
FIG. 16 is a diagram illustrating an outline of routing processing (when sending an initial event) of the Edge Concentrator in which no domain binding is present in the same domain.

Next, an outline of routing processing (when sending an initial event) of the Edge Concentrator in which a domain binding is not present in the same domain will be described. FIG. 16 is a diagram illustrating the outline of the routing processing (when sending an initial event) of the Edge Concentrator in which a domain binding is not present in the same domain. Here, it is assumed that an Edge RFID binding has already been registered. In FIG. 16, an operation of an external Concentrator will be described.

In FIG. 16, an outline of an operation will be described in which when the sensor 6 in the management domain detects a monitored ID "ERD0001TESTOBJECT00001", context information including the ID is transmitted to the Subscriber 8 that refers to the ID via the Edge Concentrator 4 in a management domain different from the management domain of the Edge Concentrator 4.

(1) First, the sensor 6 detects an RFID tag 7 having an ID of "ERD0001TESTOBJECT00001". The sensor 6 transmits a sensor event including the ID to the Originator 5.

(2) Then, since an ALE specification related to "ERD0001TESTOBJECT00001" is not set in the Originator 5, the event including the ID is transmitted to the Edge Concentrator 2_4 to which the Originator 5 is connected.

(3) Then, the Edge Concentrator 2_4 searches an Edge RFID binding table 4c2 by using "ERD0001TESTOBJECT00001" as a key. Since there is not an Edge RFID binding related to the ID, in accordance with a flow in the event processing unit 1b of the Concentrator illustrated in FIG. 5, the event is transmitted to the Domain Concentrator 3 that is an upper hierarchical Concentrator.

(4) Then, the Domain Concentrator 3 searches the domain RFID binding table 3c1 by using "ERD0001TESTOBJECT00001" as a key. Since there is a binding of the ID and the Edge Concentrator 1, the event is transmitted to the Edge Concentrator 1_4.

(5) Then, the Edge Concentrator 1_4 searches the Edge RFID binding table 4c1 by using "ERD0001TESTOBJECT00001" as a key. Since there is a binding of the ID and the Subscriber 8, the event is transmitted to the Subscriber 8.

(6) Then, the Subscriber 8 registers an ALE specification and an ALE-ID in the Originator 5 which is notified by the event and is the generation source of the event.

(7) Then, the Subscriber 8 deactivates the Edge RFID binding by transmitting an IBR (Disconnect) to the Edge Concentrator 4.

Figure 17:
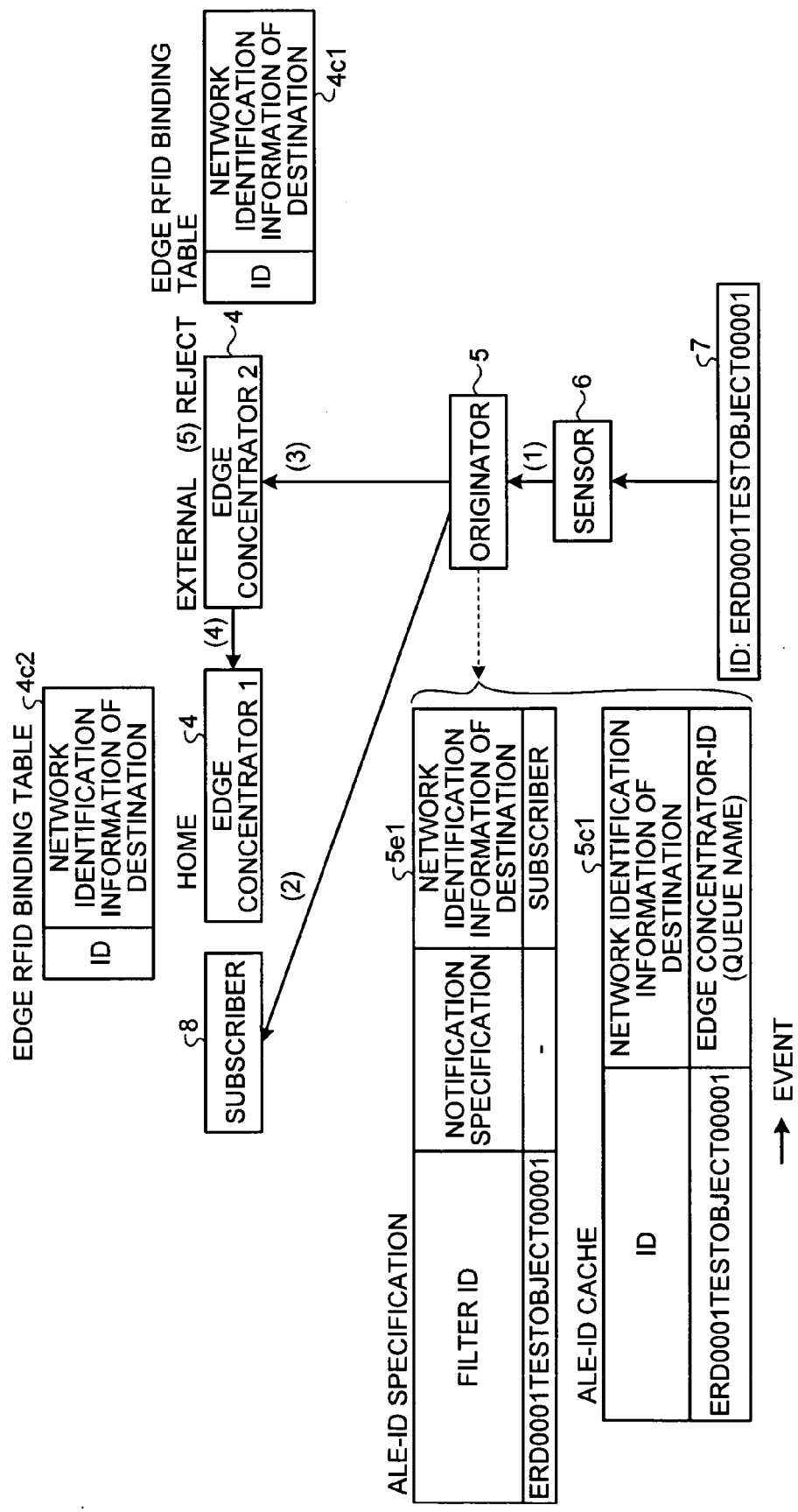
FIG. 17 is a diagram illustrating an outline of routing processing (after setting ALE) of the Edge Concentrator in which no domain binding is present in the same domain.

Next, an outline of routing processing (after setting ALE) of the Edge Concentrator in which a domain binding is not present in the same domain will be described. FIG. 17 is a diagram illustrating the outline of the routing processing (after setting ALE) of the Edge Concentrator in which a domain binding is not present in the same domain.

(1) First, the sensor 6 detects an RFID tag 7 having an ID of "ERD0001TESTOBJECT00001". The sensor 6 transmits a sensor event including the ID to the Originator 5.

(2) Then, since an ALE specification related to "ERD0001TESTOBJECT00001" is set in the Originator 5, an ALE including the ID is transmitted to the Subscriber 8 on the basis of the ALE specification.

(3) Then, the Originator 5 transmits an initial event in which information of an ALE-ID "Edge Concentrator 1" is added to the ID "ERD0001TESTOBJECT00001" on the basis of a cache content of the ALE-ID cache to the Edge Concentrator 2_4.

(4) Then, since the ALE-ID indicates the Edge Concentrator 1, the Edge Concentrator 24 transmits the event to the Edge Concentrator 1_4.

(5) Then, the Edge Concentrator 2_4 determines that the Edge Concentrator 2_4 is an ID that manages the Edge RFID binding from the ALE-ID. (5) The Edge Concentrator 2_4 searches the Edge RFID binding table 4c1 by using "ERD0001TESTOBJECT00001" as a key. Since the corresponding entry is deleted from the Edge RFID binding table 4c1, the event is rejected.

Figure 18:
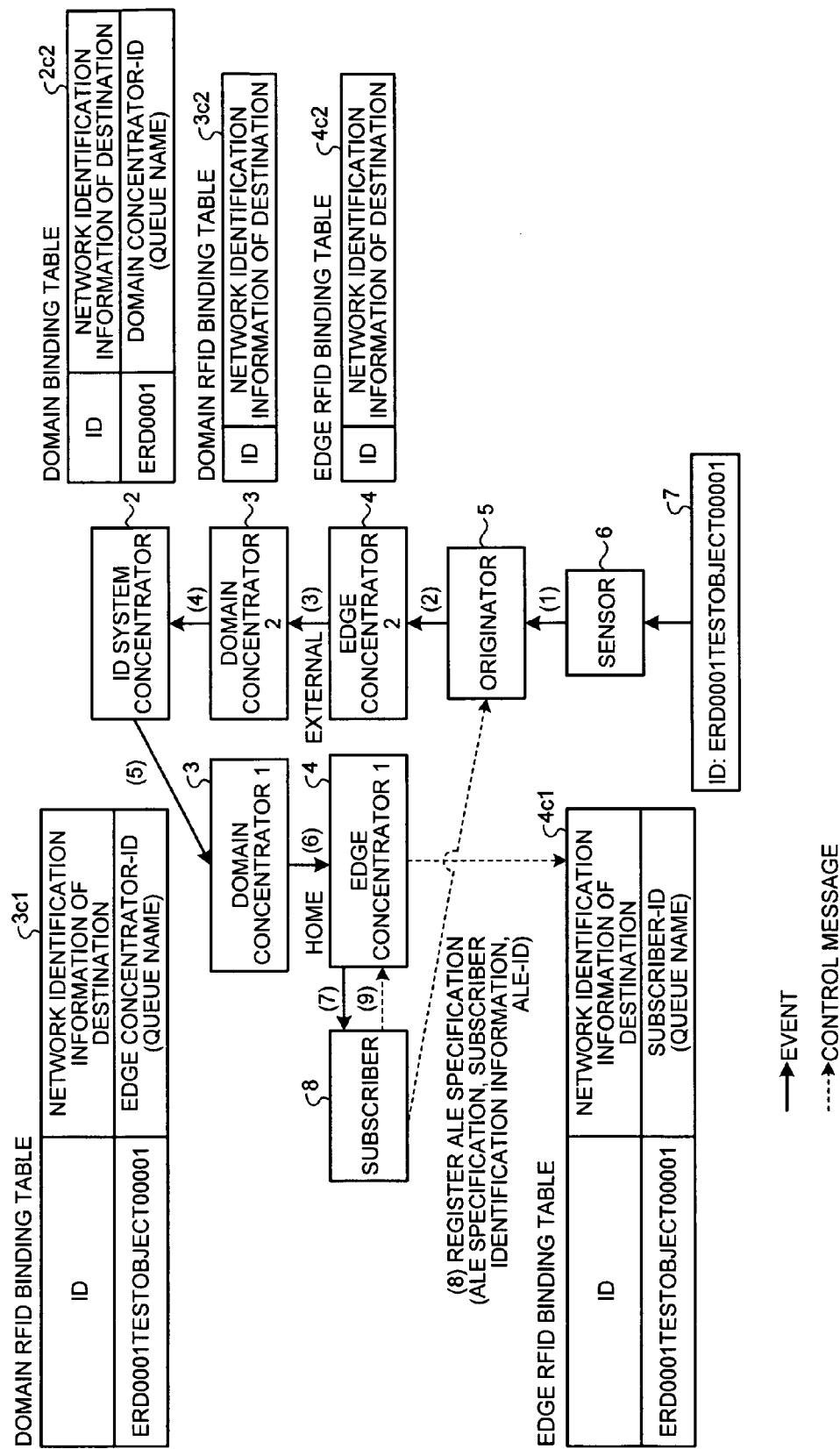
FIG. 18 is a diagram illustrating an outline of routing processing (when sending an initial event of visitor tag) to an external Edge Concentrator in which no domain binding is present.

Next, an outline of routing processing (when sending an initial event of visitor tag) to an external Edge Concentrator in which no domain binding is present will be described. FIG. 18 is a diagram illustrating the outline of the routing processing (when sending an initial event of visitor tag) to an external Edge Concentrator in which no domain binding is present.

Here, it is assumed that a global binding and an Edge RFID binding have already been registered. In FIG. 18, an outline of an operation is illustrated in which, when the sensor 6 in a certain management domain detects a monitored ID "ERD0001TESTOBJECT00001" in another management domain, context information including the ID is transmitted to the Subscriber 8 that refers to the ID beyond the boundary between the management domains.

(1) First, the RFID tag 7 having an ID of "ERD0001TESTOBJECT00001" moves to a management domain different from the management domain that manages the ID. The situation in which the RFID tag moves to a different management domain is, for example, a situation in which, even when an employee of a company of group companies is transferred to another company of the group companies, the employee receives the same services as those of the company to which the employee belonged before in the company to which the employee currently belongs. When the sensor 6 detects the ID, the sensor 6 transmits a sensor event including the ID to the Originator 5.

(2) Then, since an ALE specification related to "ERD0001TESTOBJECT00001" is not set in the Originator 5, the event including the ID is transmitted to the Edge Concentrator 2_4 to which the Originator 5 is connected.

(3) Then, the Edge Concentrator 2 searches the Edge RFID binding table 4c2 by using "ERD0001TESTOBJECT00001" as a key. Since there is not an Edge RFID binding related to the ID, in accordance with a processing procedure of the Concentrator illustrated in FIG. 5, the event is transmitted to the Domain Concentrator 2_3 that is an upper hierarchical Concentrator.

(4) Then, the Domain Concentrator 2_3 searches a domain RFID binding table 3c2 by using "ERD0001TESTOBJECT00001" as a key. Since there is not a domain RFID binding related to the ID, in accordance with the processing procedure of the Concentrator illustrated in FIG. 5, the event is transmitted to the ID System Concentrator 2 that is an upper hierarchical Concentrator.

(5) Then, the ID System Concentrator 2 searches a domain binding table 2c2 by using "ERD0001TESTOBJECT00001" as a key. Since the domain identification part "ERD0001" is bound to the Domain Concentrator 1 in the ID, the event is transmitted to the Domain Concentrator 1_3.

(6) Then, the Domain Concentrator 1_3 searches the domain RFID binding table 3c1 by using "ERD0001TESTOBJECT00001" as a key. Since there is a domain RFID binding of the ID and the Edge Concentrator 1, the event is transmitted to the Edge Concentrator 1_4.

(7) Then, the Edge Concentrator 1_4 searches the Edge RFID binding table 4c1 by using "ERD0001TESTOBJECT00001" as a key. Since there is a domain RFID binding of the ID and the Subscriber 8, the event is transmitted to the Subscriber 8.

(8) Then, the Subscriber 8 registers an ALE specification in the Originator 5 which is notified by the event and is the generation source of the event.

(9) Then, the Subscriber 8 deactivates the Edge RFID binding by transmitting an IBR (Disconnect) to the Edge Concentrator 1_4.

Figure 19:
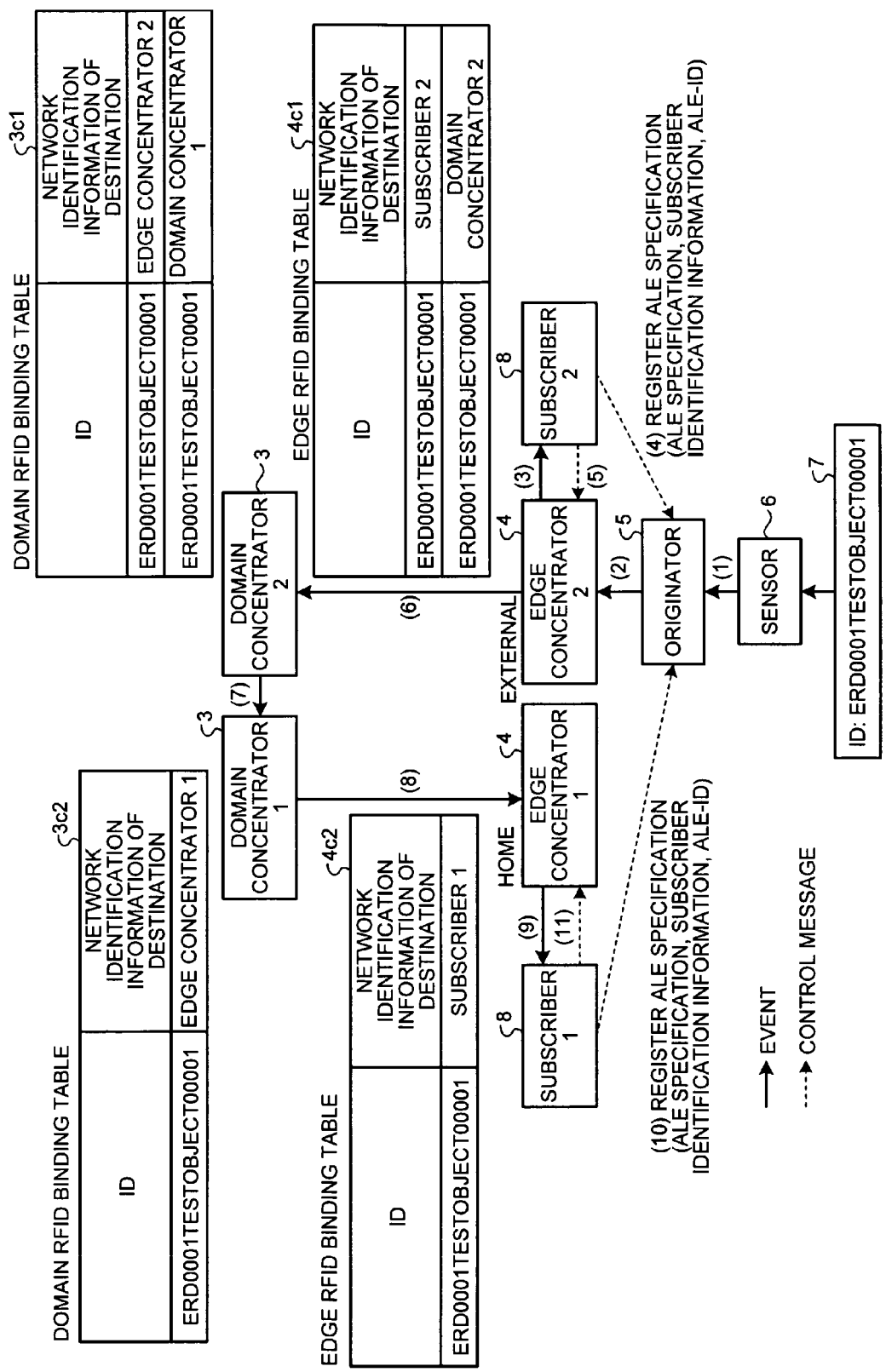
FIG. 19 is a diagram illustrating an outline of routing processing (when sending an initial event of target-cum-visitor tag) to an external Edge Concentrator in which no domain binding is present.

Next, an outline of routing processing (when sending an initial event of target-cum-visitor tag) to an external Edge Concentrator in which no domain binding is present will be described. FIG. 19 is a diagram illustrating the outline of the routing processing (when sending an initial event of target-cum-visitor tag) to an external Edge Concentrator in which no domain binding is present.

Here, it is assumed that a global binding and an Edge RFID binding have already been registered. A situation in which the target-cum-visitor tag occurs, for example, when the target is a product such as an office machine used in an office, the product is monitored by the manufacturer of the product for the maintenance of the product after the sales of the product, and on the other hand, a company that purchased the product secondarily uses the ID to manage machines in the company. The description below assumes the situation as described above.

In FIG. 19, an outline of an operation will be described in which when a sensor of a company that purchased a product detects an ID "ERD0001TESTOBJECT00001", context information including the ID is transmitted to the Subscriber 2 in the company which refers to the ID and the Subscriber 1 in a sales maker which refers to the ID beyond the boundary of the management domain.

(1) First, an RFID tag 7 having an ID of "ERD0001TESTOBJECT00001" moves to a management domain in a company that purchased the product. The management domain is different from a management domain of the maker that manages the ID. The sensor 6 detects the ID. Then, the sensor 6 transmits a sensor event including the ID to the Originator 5.

(2) Then, since an ALE specification related to "ERD0001TESTOBJECT00001" is not set in the Originator 5, the event including the ID is transmitted to the Edge Concentrator 2_4 to which the Originator 5 is connected.

(3) Then, the Edge Concentrator 2_4 searches the Edge RFID binding table 4c1 by using "ERD0001TESTOBJECT00001" as a key. Since there is an Edge RFID binding of the ID and the Subscriber 2_8, the event is transmitted to the Subscriber 2_8.

(4) Then, the Subscriber 2_8 registers an ALE specification in the Originator 5 which is notified by the event and is the generation source of the event.

(5) Then, the Subscriber 2_8 deactivates the Edge RFID binding by transmitting an IBR (Disconnect) to the Edge Concentrator 2_4.

(6) Then, since there is a binding of the ID and the Domain Concentrator 2_3 in the Edge Concentrator 2_4 when referring to the Edge RFID binding table 4c1, the Subscriber 2_8 transmits the event to the Domain Concentrator 2_3.

(7) Then, the Domain Concentrator 2_3 searches the domain RFID binding table 3c1 by using the ID "ERD0001TESTOBJECT00001" as a key. Since there are two bindings related to the ID in the domain RFID binding table 3c1, in accordance with the processing procedure of the Concentrator illustrated in FIG. 5, by selecting from the two bindings, the event is transmitted to the Domain Concentrator 1_3 that is not the Concentrator that has transmitted the event.

(8) Then, the Domain Concentrator 1_3 searches the domain RFID binding table 3c2 by using the ID "ERD0001TESTOBJECT00001" as a key. Since there is a domain RFID binding of the ID and the Edge Concentrator 1_4, the event is transmitted to the Edge Concentrator 1_4.

(9) Then, the Edge Concentrator 1_4 searches the Edge RFID binding table 4c2 by using the ID "ERD0001TESTOBJECT00001" as a key. Since there is an Edge RFID binding of the ID and the Subscriber 1_8, the event is transmitted to the Subscriber 1_8.

(10) Then, the Subscriber 1_8 registers an ALE specification in the Originator 5 which is notified by the event and is the generation source of the event.

(11) Then, the Subscriber 1_8 deactivates the Edge RFID binding by transmitting an IBR (Disconnect) to the Edge Concentrator 1_4.

Figure 20:
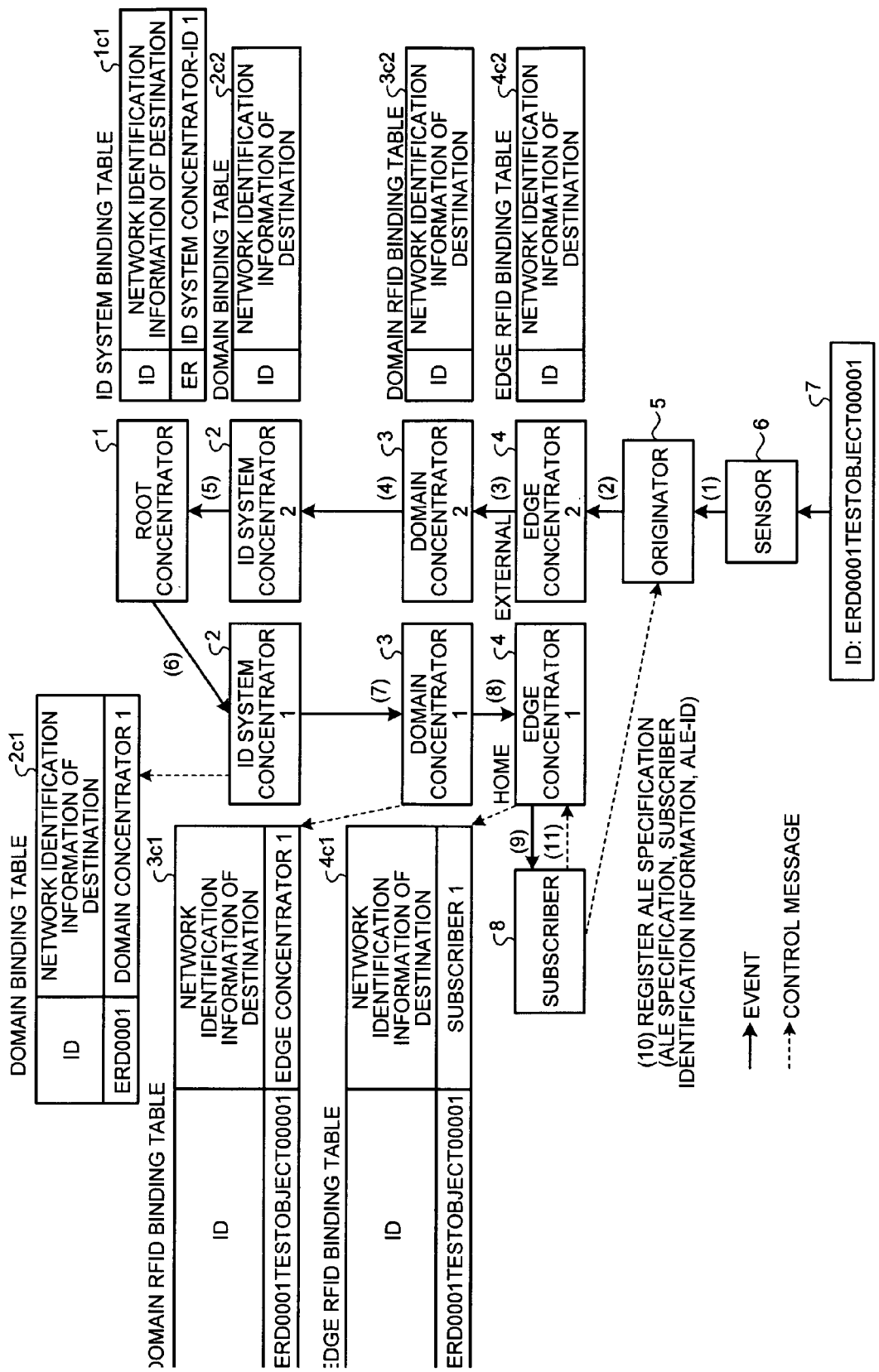
FIG. 20 is a diagram illustrating an outline of routing processing (when sending an initial event) to an external Concentrator for which no ID binding is present.

Next, an outline of routing processing (when sending an initial event) to an external Concentrator in which no ID binding is present will be described. FIG. 20 is a diagram illustrating the outline of the routing processing (when sending an initial event) to an external Concentrator in which no ID binding is present.

Here, it is assumed that an Edge RFID binding has already been registered. In FIG. 20, an outline of an operation will be described in which when the sensor 6 in a management domain where a different ID system is used detects an identifier "ERD0001TESTOBJECT00001" having an ID system different from the ID system monitored in the management domain, context information including the ID is transmitted to the Subscriber 8 that refers to the ID beyond the boundary of the ID system.

(1) First, the RFID tag 7 having an ID of "ERD0001TESTOBJECT00001" moves to a different management domain in which identification information identified by a completely different ID system "AA" is used. Such a situation is, for example, a situation in which a plurality of public transportation systems employ electronic money having an ID system different from each other and the electronic money can be commonly used among the public transportation systems so as to improve convenience of passengers who change the transportation system. The sensor 6 detects the ID, and the sensor 6 transmits a sensor event including the ID to the Originator 5.

(2) Then, since an ALE specification related to "ERD0001TESTOBJECT00001" is not set in the Originator 5, the event including the ID is transmitted to the Edge Concentrator 2_4 to which the Originator 5 is connected.

(3) Then, the Edge Concentrator 2_4 searches the Edge RFID binding table 4c2 by using the ID "ERD0001TESTOBJECT00001" as a key. Since there is not an Edge RFID binding related to the ID, in accordance with the processing procedure of the Concentrator illustrated in FIG. 5, the event is transmitted to the Domain Concentrator 2_3 that is an upper hierarchical Concentrator.

(4) Then, the Domain Concentrator 2_3 searches the domain RFID binding table 3c2 by using the ID "ERD0001TESTOBJECT00001" as a key. Since there is not a domain RFID binding related to the ID, in accordance with the processing procedure of the Concentrator illustrated in FIG. 5, the event is transmitted to the ID System Concentrator 2_3 that is an upper hierarchical Concentrator.

(5) Then, the ID System Concentrator 2_3 searches the domain binding table 2c2 by using a domain part of the ID "ERD0001TESTOBJECT00001" as a key. Since there is not a domain binding related to the ID, in accordance with the processing procedure of the Concentrator illustrated in FIG. 5, the event is transmitted to the Root Concentrator 1 that is an upper hierarchical Concentrator.

(6) Then, the Root Concentrator 1 searches the ID system binding table 1c1 by using an ID system identification "ER" as an index. Since there is an ID system binding related to the ID, in accordance with the processing procedure of the Concentrator illustrated in FIG. 5, the event is transmitted to the ID System Concentrator 1_2.

(7) Then, the ID System Concentrator 12 searches the domain binding table 2c1 by using the domain part of the ID "ERD0001TESTOBJECT00001" as a key. Since there is a domain binding related to the ID, in accordance with the processing procedure of the Concentrator illustrated in FIG. 5, the event is transmitted to the Domain Concentrator 13.

(8) The Domain Concentrator 1_3 searches the domain RFID binding table 3c1 by using the ID "ERD0001TESTOBJECT00001" as a key. Since there is a domain RFID binding of the ID and the Edge Concentrator 1_4, the event is transmitted to the Edge Concentrator 1_4.

(9) Then, the Edge Concentrator 1_4 refers to the Edge RFID binding table 4c1 by using the ID "ERD0001TESTOBJECT00001" as a key. Since there is an Edge RFID binding of the ID and the Subscriber 8, the event is transmitted to the Subscriber 8.

(10) Then, the Subscriber 8 registers an ALE specification in the Originator 5 which is notified by the event and is the generation source of the event.

(11) Then, the Subscriber 8 deactivates the Edge RFID binding by transmitting an IBR (Disconnect) to the Edge Concentrator 1_4.

Figure 21A:
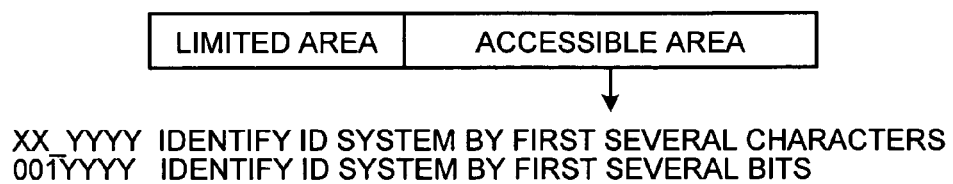
FIG. 21A is a diagram illustrating an example of a data configuration in a memory of an RFID tag and a sensor.
Figure 21B:
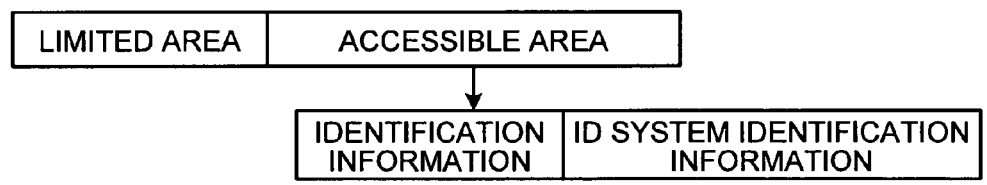
FIG. 21B is a diagram illustrating another example of a data configuration in a memory of the RFID tag and the sensor.

Next, an example of a data configuration in a memory of the RFID tag and the sensor will be described. FIG. 21A is a diagram illustrating an example of the data configuration in a memory of the RFID tag and the sensor. FIG. 21B is a diagram illustrating another example of the data configuration in a memory of the RFID tag and the sensor.

Generally, information transmitted from the RFID tag 7 includes identification information and ID system identification information that indicates the type of the ID system of the identification information. Normally, the RFID tag 7 is constituted by a limited area where a maker or an administrator can access and an accessible area where the sensor 6 compatible with a standard can read data.

The example of the data configuration in a memory of the RFID tag and the sensor illustrated in FIG. 21A is a method for providing the ID system identification information to the prefix of the identification information. For example, the method determines the ID system by the first several characters of the identification information or the first several bits of the identification information.

The example of the data configuration in a memory of the RFID tag and the sensor illustrated in FIG. 21B is a method for providing an identification information field and an ID system identification information field in the accessible area of the memory and separately reading the identification information and the ID system identification information.

The sensor 6 is installed so that the sensor 6 can read the identification information and the ID system identification information in accordance with the data configuration in the memory of the RFID tag 7. The sensor 6 configures the identification information from the read information by using XML tags as illustrated in the table below so that a device other than the sensor 6 can identify the identification information and the ID system identification information.

TABLE 9

<Id>
   <System>fj</System>
   <RFID>fjqent01</RFID>
</Id>

According to an example of the above embodiment, the ID is collected from the network, devices searching the ID are hierarchized in the entire network, and the embodiment is constituted by a domain hierarchy in which information is sorted by only the uniqueness of the ID independent from the ID system and an ID system hierarchy in which information depending on the ID system is sorted between domains.

A management source of the ID is unified for each ID in the domain hierarchy, and only the ID that needs to be sorted between domains is registered in the ID system hierarchy, so that path tables (tying information) are distributed for each domain and correspondence tables of the ID and the network identifier can be aggregated without causing all the devices to have the correspondence table. Hence, the problem that all the devices on the network to which load is distributed need to have the correspondence table between the ID and the identifier of the network device that refers to the ID, and the problem that paths cannot be aggregated are solved. In summary, a difference between the ID systems is absorbed in the hierarchized system configuration constituted by the management domain hierarchy and the ID system hierarchy, and the context information can be collected efficiently.

The ID of information (information including the ID or context information) that is once notified to a referrer is tied to the network identification information of a management source device that manages the ID. Hence, the device that sorts information can directly sort the information to the management source device in the same domain without transmitting the information to the upper hierarchy. Thus, traffic concentration to the upper hierarchy is avoided, and the problem of traffic concentration due to the hierarchized approach which occurs when the load is distributed is solved.

By solving the above problems, devices that efficiently collect and select IDs that exist on the network in large numbers and move freely on the network can be disposed in accordance with network topology while the load is distributed. Thus, a large scale context information collection system that can search ID quickly by efficient processing can be realized.

Although an example of the embodiment of the present invention has been described above, the present invention is not limited to this, but various types of embodiments may be implemented within the technical scope described in the claims. The effects described in an example of the embodiment is not limited to these.

In each processing described in an example of the above embodiment, all or part of the processing described to be automatically performed can be performed manually, or all or part of the processing described to be manually performed can be performed automatically by a publicly known method. Moreover, the processing procedures, control procedures, specific names, and information including various data and parameters described in an example of the above embodiment can be arbitrarily changed unless otherwise stated.

The constituent elements of the devices illustrated in the drawings are functionally conceptual, and need not necessarily be physically configured as illustrated. In other words, specific forms of distribution and integration of the devices are not limited to those illustrated in the drawings, and all or part of the devices can be functionally or physically distributed or integrated in arbitrary units according to various loads and the state of use.

Moreover, all or an arbitrary part of the processing functions performed in each device may be realized by a CPU (Central Processing Unit), an MPU (Micro Processing Unit), or an MCU (Micro Controller Unit) and a program analyzed and executed by the CPU (or a microcomputer such as the MPU or the MCU), or may be realized as hardware by wired logic.

According to the disclosed context information collection management system, target identification information detection and collection management device, domain management device, semantic information system management device, route management device, and context information collection management method, effects are produced in which the correspondence relationship between the identification information and the identification information of the network devices that refer to the identification information can be distributed to each domain without causing all the network devices to which the load is distributed to have a correspondence table between the identification information and network identification information, and the context information around a thing or a person to which desired identification information is added can be obtained in rapid processing without increasing network traffic by lightening load distribution and aggregating the search paths of the identification information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A context information collection management system for managing a target ID, the target ID including a first part and a second part, the first part identifying a type of a target and a domain to which the target belongs, a second part uniquely identifying the target, the context information collection management system comprising:
   a first computer device that is disposed in a first hierarchy;
   second computer devices that are disposed in a second hierarchy just under the first hierarchy;
   third computer devices that are disposed in a third hierarchy just under the second hierarchy; and
   fourth computer devices that are disposed in a fourth hierarchy just under the third hierarchy, wherein
   each of the third computer devices
      comprises a first table having a correspondence relationship between the first part, the second part and an ID of each of the fourth computer devices,
      obtains the target ID,
      when a combination of the first part and the second part included in the obtained target ID exists in the first table, transmits the obtained target ID to a specific fourth computer device having an ID corresponding to the existed combination among the fourth computer devices, and
      when the combination of the first part and the second part included in the obtained target ID does not exist in the first table, transmits the obtained target ID to any one of the second computer devices, and
   each of the second computer devices
      comprises a second table having a correspondence relationship between the first part and an ID of each of the third computer devices,
      receives the target ID transmitted from any one of the third computer devices,
      when the first part included in the received target ID exists in the second table, transmits the received target ID to a specific third computer device having an ID corresponding to the existed first part among the third computer devices, and
      when the first part included in the received target ID does not exist in the second table, transmits the received target ID to the first computer device.

2. The context information collection management system according to claim 1, wherein
   the each of the third computer devices, between the fourth computer devices in the same domain, transmits the obtained target ID.

3. The context information collection management system according to claim 1, wherein
   the each of the second computer devices, transmits the target ID received from the any one of the third computer devices to the specific third computer device in a domain different from a domain of the any one of the third computer devices.

4. The context information collection management system according to claim 1, wherein the first computer device transmits the target ID received from any one of the second computer devices to another second computer device which belongs to a semantic information system different from a semantic information system in which the any one of the second computer devices.

5. The context information collection management system according to claim 1, wherein
the each of the second computer devices associates the target ID received from the any one of the third computer devices with a network ID of another third computer device.

6. The context information collection management system according to claim 1, wherein
the each of the third computer devices associates the target ID received from any one of the fourth computer devices with a network ID of another fourth computer device.

7. The context information collection management system according to claim 1, wherein
the first computer device associates semantic information included in the target ID received from any one of the second computer devices with a network ID of another second computer device.

8. A context information collection management method in which a context information collection management system comprises a first computer device disposed in a first hierarchy, second computer devices disposed in a second hierarchy just under the first hierarchy, third computer devices disposed in a third hierarchy just under the second hierarchy and fourth computer devices disposed in a fourth hierarchy just under the third hierarchy and manages a target ID, the target ID including a first part and a second part, the first part identifying a type of a target and a domain to which the target belongs, a second part uniquely identifying the target, the context information collection management method comprising:
in each of the third computer devices,
obtaining the target ID,
when a combination of the first part and the second part included in the obtained target ID exists in the first table having a correspondence relationship between the first part, the second part and an ID of each of the fourth computer devices, transmitting the obtained target ID to a specific fourth computer device having an ID corresponding to the existed combination among the fourth computer devices, and
when the combination of the first part and the second part included in the obtained target ID does not exist in the first table, transmitting the obtained target ID to any one of the second computer devices, and
in each of the second computer devices,
receiving the target ID transmitted from any one of the third computer devices,
when the first part included in the received target ID exists in the second table having a correspondence relationship between the first part and an ID of each of the third computer devices, transmitting the received target ID to a specific third computer device having an ID corresponding to the existed first part among the third computer devices, and
when the first part included in the received target ID does not exist in the second table, transmitting the received target ID to the first computer device.

9. The context information collection management method according to claim 8, wherein
in the each of the third computer devices, between the fourth computer devices in the same domain, transmitting the obtained target ID.

10. The context information collection management method according to claim 8, wherein
in the each of the second computer devices, transmitting the target ID received from the any one of the third computer devices to the specific third computer device in a domain different from a domain of the any one of the third computer devices.

11. The context information collection management method according to claim 8, wherein
in the first computer device, transmitting the target ID received from any one of the second computer devices to another second computer device which belongs to a semantic information system different from a semantic information system in which the any one of the second computer devices.

* * * * *